United States Patent
Ohno et al.

(10) Patent No.: US 7,978,839 B2
(45) Date of Patent: Jul. 12, 2011

(54) COMMUNICATION SYSTEM, SERVER EQUIPMENT AND TERMINAL EQUIPMENT

(75) Inventors: Takashi Ohno, Kawasaki (JP); Kenichi Horio, Kawasaki (JP); Masahide Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 896 days.

(21) Appl. No.: 11/986,847

(22) Filed: Nov. 27, 2007

(65) Prior Publication Data

US 2008/0181383 A1    Jul. 31, 2008

(30) Foreign Application Priority Data

Jan. 26, 2007   (JP) ................. 2007-016938

(51) Int. Cl.
*H04M 3/42* (2006.01)
*H04B 7/00* (2006.01)

(52) U.S. Cl. ........... 379/202.01; 379/201.01; 455/414.1; 455/416; 455/518

(58) Field of Classification Search ............ 379/202.01, 379/201.01, 167.12; 455/414.1, 416, 518
See application file for complete search history.

(56) References Cited

U.S. PATENT DOCUMENTS

| 2004/0170262 A1* | 9/2004 | Ohno ................. 379/167.12 |
| 2005/0221851 A1 | 10/2005 | Grivas et al. |
| 2006/0171528 A1 | 8/2006 | Kaida |

FOREIGN PATENT DOCUMENTS

| JP | 2006-135511 | 5/2006 |
| JP | 2006-180143 | 7/2006 |
| WO | WO 02/089501 | 11/2002 |
| WO | WO 2006/034067 | 3/2006 |
| WO | WO 2006/052109 | 5/2006 |

OTHER PUBLICATIONS

N. Ismail; "Conferencing Scenarios"; Even Polycom; Cisco Systems, Inc.; rfc4597.txt; IETF Standard, Internet Engineering Task Force; IETF, Ch. 1; Jul. 2006; pp. 1-17.

* cited by examiner

*Primary Examiner* — Thjuan K Addy
(74) *Attorney, Agent, or Firm* — Greer, Burns & Crain, Ltd.

(57) ABSTRACT

PoC server has an audio data receiving section 305 that receives the audio data transmitted from a cellular phone, an audio data transmitting section that transfers the audio data to individual cellular phones other than the speaker's one, of two or more cellular phones, a receiving user storage section that stores therein receiving association data indicative of the association between the cellular phone having the speaker right and the cellular phones of the receiving users, and a receiving user grasp section that causes the audio data transmitting section to transfer the audio data with designation of the cellular phone of the receiver.

22 Claims, 23 Drawing Sheets

| SPEAKERS | RECEIVERS | USER NAMES |
|---|---|---|
|  |  | USER A |
|  |  | USER B |
|  |  | USER C |
|  |  | USER D |

Fig. 6

| SPEAKERS | RECEIVERS |
|---|---|
| CENTER | ALL |
| TAXI-A | CENTER |
| TAXI-B | CENTER |
| TAXI-C | CENTER |

Fig. 9

COMMUNICATION SYSTEM, SERVER EQUIPMENT AND TERMINAL EQUIPMENT

BACKGROUND OF THE INVENTION

1. Field of the Invention

The present invention relates to a communication system in which voice is reproduced on a real time basis in two or more terminal equipments, server equipment that is used in such a communication system, and terminal equipment that is used in such a communication system.

2. Description of the Related Art

Recently, IP (Internet Protocol) telephones, which talk over the telephone using terminal equipment connected with an IP (Internet Protocol) net, through the IP net, have come into wide use rapidly. Particularly, technologies referred to as PoC (Push-to-Talk over Cellular) that performs a broadcast voice call (session), and PoC/W (Push-to-Talk over Cellular/Wireless), attract attention by using the terminal equipment of the IP telephone like the transceiver among two or more users (for example, refer to Japanese Patent Publication Toku-Kai. 2006-135511 and Japanese Patent Publication TokuKai. 2006-180143). Hereafter, it is called PoC especially distinguishing neither PoC nor PoC/W.

According to PoC, a communication system, which comprises two or more terminal equipments and a predetermined server equipment, is constructed in such a way that the server equipment establishes a communication line between terminal equipments each two or more users that participate in one session. According to the communication system, audio data transmitted from arbitrary terminal equipment is transferred by the server equipment to other terminal equipment, so that the terminal equipment of the destination reproduces the voice represented by the audio data on a real time basis. Thus, the session among two or more users is possible.

Transmission of audio data in the communication system is permitted when the terminal equipment obtains the right (speaker right) of transmission of audio data. A switch special to demand this speaker right from the server equipment has been often installed in the terminal equipment of PoC. When the user depresses the switch, the server equipment gives the speaker right to the user's terminal equipment. When the user speaks while pushing the switch, the voice data representative of the speaking voice are transmitted from the server equipment to other terminal equipments on a broadcast basis. At that time, the effect that the speaker right is being acquired by other terminal equipment now is notified to other terminal equipments. When the user of the terminal equipment having the speaker right, that is, the speaker terminates the speech and releases the switch, the speaker right is restored to the server equipment, and the acquisition of the speaker right with other terminal equipments becomes possible. Thus, according to PoC, acquisition and restoration of the speaker right are repeated between the terminal equipments in the communication system, so that voice interaction is carried out between two or more users.

According to PoC as mentioned above, in the event that it is desired to pass on certain information to two or more users, it is possible to pass on once speech to two or more users on a broadcast basis. This feature makes it possible to reduce cost and time for talking to two or more users. Moreover, in the event that the other party, who is a person of interest to speak, is as much as one person, contents of the speech are transmitted to two or more users on a broadcast basis. This feature makes it possible to share among two or more users contents of speech and the fact recognition that the contents were passed on to the one other party.

By the way, there is a case where, in talking by using PoC only, it is desired to talk only to some of users who are participating in the session.

For example, it is considered that a communication system using PoC is applied to a so-called taxi radio system for performing a radio communication between a management center and two or more taxies in a taxi company. In this case, there is established a session in which the management center and two or more taxies participate. While there is a need that an instruction from the a management center is transmitted to all the taxies, it is desirable that speech contents from individual taxies to the management center are transmitted to only the management center, since there is a possibility that the speech contents from individual taxies to the management center include client information and the like. Moreover, for example, it is considered that a communication system using PoC is applied to a session among a construction manager and two or more workers in a construction site. In this case, there is established a session in which the construction manager and two or more workers participate. While there is a need that an instruction from the construction manager is transmitted to all the workers, there is no need for the construction manager to receive speech contents telling work situation detailed among workers each other, and it is desirable that such speech contents are transmitted to only the workers. Still moreover, for example, it is considered that a communication system using PoC is applied to a general session among two or more users. In this case, assuming that some users wish to have a confidential talk with a part of the users while all talking, it is desirable that speech contents of the user who talks in whispers are transmitted to only the party of the secret story.

However, it is principally impossible for the conventional communication system using PoC to talk over with only some uses of the users who participates in a session. To talk over the telephone only to some users with the conventional communication system, a new session that consists only of the speaker and some the users is needed besides a present session. For example, according to the above-mentioned taxi radio system, there is needed a session in which two parties of individual taxi and the management center participate, in addition to the session in which all taxies and the management center participate. The later session is needed for each taxi. Moreover, according to the example of the session of the construction site, there is needed a session consisting of only the workers, in addition to the session in which all workers and the construction manager participate. Still moreover, according to the example of the session of the confidential speech, there is needed a session consisting of only the users who wish to have a confidential talk, in addition to the session in which all users participate. When the users who participate in a confidential talk changes, a new session is needed in every case.

It not only increases the resource consumed on the network used to communicate but also obliges the system to establish additional two or more sessions to hold two or more sessions like this. Thus, this involves a problem that complex management of these two or more sessions is needed.

In the above, though it explained the problem when talking by PoC only to some users of users who are participating in the session among users who participate in the session enumerating the communication system using PoC as an example, such a problem is a problem that can be caused by common to the communication system that performs a broadcast data communication between two or more terminal equipments.

SUMMARY OF THE INVENTION

In view of the foregoing, it is an object of the present invention to provide a communication system that performs a broadcast data communication between two or more terminal equipments, which is capable of communicating with only some terminal equipments in a simple way, server equipment that is used in such a communication system, and terminal equipment that is used in such server equipment.

To achieve the above-mentioned object, the present invention provides a communication system that includes one or more terminal equipments and a server equipment, transmits audio data representing a voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment; and a transfer restriction section that restrictively transfers the audio data to the transfer terminal equipment when the audio data transfer section transfers the audio data, each of the terminal equipments comprising:

an audio data transmitting section that transmits the audio data;

a transferred audio data receiving section that receives the audio data transferred from the server equipment; and an audio reproducing section that reproduces in real-time the voice represented by the audio data received by the transferred audio data receiving section.

In the communication system according to the present invention as mentioned above, it is acceptable that the transfer destination setting section indirectly sets the transfer terminal equipment in such a manner that non-transfer terminal equipment that prohibits transfer of the audio data is set.

According to the communication system of the present invention, the audio data from the originating terminal equipment is transferred only the transfer terminal equipment that is set to the transfer destination setting section with an association with the originating terminal equipment. Thus, according to the communication system of the present invention, it is possible to communicate only with a part of terminal equipment according to the setting easily by operation of setting desired transfer terminal equipment or non-transfer equipment to the transfer destination setting section beforehand for instance in the broadcast data communication between two or more terminal equipments.

In the communication system according to the present invention as mentioned above, it is preferable that the transfer destination setting section associates the transfer terminal equipment with individual terminal equipment.

According to the communication system of the present invention as mentioned above, when an other party of the communication limited in each terminal equipment is decided beforehand, setting the limited other party of the communication as the transfer terminal equipment about each terminal equipment makes it possible that the communication that limits such an other party of the communication can be done more easily, because the limited intended party of the originating terminal equipment is automatically decided while communicating.

In the communication system according to the present invention as mentioned above, it is preferable that the terminal equipment comprises:

an association data creating section that creates association data representative of an association between the transfer terminal equipment and individual terminal equipment in accordance with an operation; and an association data transmitting section that transmits the association data created by the association data creating section, and that the server equipment comprises:

an association data receiving section that receives the association data and sets the transfer terminal equipment to the transfer destination setting section in accordance with the association represented by the association data.

According to the communication system of the present invention as mentioned above, the association data is created with one of the plural terminal equipments according to the user's operation, and sent from the terminal equipment to the server equipment according to suitable timing. As a result, it is possible to flexibly set the other party of the communication on individual terminal equipment.

In the communication system according to the present invention as mentioned above, it is preferable that the terminal equipment comprises:

a transfer terminal input section that inputs the transfer terminal equipment through an input operation where one's own terminal equipment becomes the originating terminal equipment; and a transfer terminal notification section that notifies the server equipment of the transfer terminal equipment input by the transfer terminal input section, and wherein the server equipment comprises:

a notification setting section that sets the transfer terminal equipment to the transfer destination setting section associating with the terminal equipment that notifies of the transfer terminal equipment upon receipt of notification of the transfer terminal equipment from the terminal equipment.

According to the communication system of the present invention, one's own equipment can designate the transfer destination of the audio data transmitted from the one's own cellular phone. This feature makes it possible to more flexibly set the other party of the communication on individual terminal equipment.

In the communication system according to the present invention as mentioned above, it is preferable that the server equipment comprises:

a busy information transmitting section that transmits busy information indicative of the effect that other terminal equipment is the originating terminal equipment to other terminal equipments excepting the originating terminal equipment, of two or more terminal equipments, and that the terminal equipment comprises:

a busy notification section that notifies a user of one's own terminal equipment of the effect that other terminal equipment is the originating terminal equipment upon receipt of the busy information.

In the communication system according to the present invention as mentioned above, it is preferable that the server equipment comprises:

a busy information transmitting section that transmits busy information indicative of the effect that other terminal equipment is the originating terminal equipment to other terminal equipments excepting the originating terminal equipment, of two or more terminal equipments, and that the terminal equipment comprises:

a busy notification section that notifies with an image a user of one's own terminal equipment of the effect that other terminal equipment is the originating terminal equipment upon receipt of the busy information.

According to the communication system of the present invention as mentioned above, as for the remark, the user of the non-transfer terminal equipment can know it to be improper specifying it though the user of the non-transfer terminal equipment doesn't get the voice reproduced with one's own terminal equipment.

In the communication system according to the present invention as mentioned above, it is preferable that the server equipment comprises:

a busy information transmitting section that transmits busy information indicative of the effect that other terminal equipment is the originating terminal equipment on a basis that what terminal equipment is the originating terminal equipment, to other terminal equipments excepting the originating terminal equipment, of two or more terminal equipments, and that the terminal equipment comprises:

a busy notification section that notifies a user of one's own terminal equipment of the effect that other terminal equipment is the originating terminal equipment upon receipt of the busy information.

In the communication system according to the present invention as mentioned above, it is preferable that the server equipment comprises:

a busy information transmitting section that transmits busy information indicative of the effect that other terminal equipment is the originating terminal equipment on a basis that what terminal equipment is the originating terminal equipment, to other terminal equipments excepting the originating terminal equipment, of two or more terminal equipments, and that the terminal equipment comprises:

a busy notification section that notifies with an image unable to specify the originating terminal equipment a user of one's own terminal equipment of the effect that other terminal equipment is the originating terminal equipment upon receipt of the busy information.

According to the communication system of the present invention as mentioned above, for instance, in the event that it is wished that the user in communicating is concealed from users other than the user of the transfer terminal equipment, the user in communicating can be concealed though informing those users of the communication at present in the image and the like.

In the communication system according to the present invention as mentioned above, it is preferable that the terminal equipment comprises:

a concealment terminal input section that inputs through an input operation a concealment terminal equipment from which it is to be concealed that one's own terminal equipment becomes the originating terminal equipment; and a concealment terminal notification section that notifies the server equipment of the concealment terminal equipment input by the concealment terminal input section, that the server equipment comprises:

a busy information transmitting section that transmits busy information indicative of the effect that other terminal equipment is the originating terminal equipment on a basis that what terminal equipment is the originating terminal equipment, to the concealment terminal equipment of two or more terminal equipments, and that the terminal equipment further comprises:

a busy notification section that notifies a user of one's own terminal equipment of the effect that other terminal equipment is the originating terminal equipment upon receipt of the busy information.

According to the communication system of the present invention as mentioned above, for instance, when one's own equipment is the originating terminal equipment, the concealment terminal equipment is input. This feature makes it possible to desirably designate the user from whom it is concealed that the one's own terminal equipment is the originating terminal equipment.

In the communication system according to the present invention as mentioned above, it is preferable that the server equipment comprises:

a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, and that the terminal equipment comprises:

a confirmation section that confirms a stop of transfer of the audio data from the originating terminal equipment to a user of one's own terminal equipment in accordance with the non-transfer confirmation information upon receipt of the non-transfer confirmation information; and a non-transfer notification section that notifies a user of one's own terminal equipment of the effect that one's own terminal equipment does not receive the audio data, when the confirmation section confirms a stop of transfer of the audio data.

In the communication system according to the present invention as mentioned above, it is preferable that the server equipment comprises:

a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, and that the terminal equipment comprises:

a confirmation section that confirms a stop of transfer of the audio data from the originating terminal equipment to a user of one's own terminal equipment in accordance with the non-transfer confirmation information upon receipt of the non-transfer confirmation information; and a non-transfer notification section that notifies with an image a user of one's own terminal equipment of the effect that one's own terminal equipment does not receive the audio data, when the confirmation section confirms a stop of transfer of the audio data.

According to the communication system of the present invention as mentioned above, the user of the non-transfer terminal equipment can understand by the image and the like that the system is busy with a matter that does not concern the user.

In the communication system according to the present invention as mentioned above, it is acceptable that the server equipment comprises:

a specifying information transmitting section that transmits non-transfer specifying information indicative of the effect that the audio data is not transferred, to other terminal equipments excepting both the originating terminal equipment and the transfer terminal equipment, of two or more terminal equipments, and that the terminal equipment comprises:

a non-transfer notification section that notifies a user of one's own terminal equipment of the effect that one's own terminal equipment does not receive the audio data, upon receipt of the non-transfer specifying information.

In the communication system according to the present invention as mentioned above, it is acceptable that the server equipment comprises:

an originating terminal transmitting section that transmits originating terminal information indicative of the terminal equipment which is the originating terminal equipment, to other terminal equipments excepting the originating terminal equipment, of two or more terminal equipments, and that the terminal equipment comprises:

an association storage section that stores an association of the transfer terminal equipments with two or more terminal equipments respectively;

a decision section that decides whether one's own terminal equipment is one concerned with the stop of transfer of the audio data from the originating terminal equipment by referring to the association stored in the association storage section for the terminal equipment indicated by the originating terminal information, upon receipt of the originating terminal information; and a non-transfer notification section that notifies a user of one's own terminal equipment of the effect that one's own terminal equipment does not receive the audio data, when the decision section decides that one's own terminal equipment is one concerned with the stop of transfer of the audio data.

According to the communication system of the present invention as mentioned above, individual terminal equipment comes to recognize directly or indirectly whether the transmission of the audio data is stopped to one's own terminal equipment.

In the communication system according to the present invention as mentioned above, it is acceptable that the terminal equipment comprises:

a start requesting section that designates two or more terminal equipments including one's own terminal equipment and demands beginning of the transmission of the audio data between two or more the terminal equipments from the server equipment, that the server equipment comprises:

a transfer start section that causes the audio data transfer section to begin the transmission of the audio data between two or more specified terminal equipments when beginning of the transfer is demanded by the terminal equipment;

an association data delivery section that delivers association data indicative of the association of the transfer terminal equipment with each the two or more terminal equipments to each two or more terminal equipments when transmission of the audio data by the audio data transfer section is begun; and an originating terminal transmitting section that transmits originating terminal information indicative of the terminal equipment which is the originating terminal equipment, to other terminal equipments excepting the originating terminal equipment, of two or more terminal equipments, and that the terminal equipment comprises:

an association storage section that receives the association data delivered from the server equipment and stores the association represented by the association data; a decision section that decides whether one's own terminal equipment is one concerned with the stop of transfer of the audio data from the originating terminal equipment by referring to the association stored in the association storage section for the terminal equipment indicated by the originating terminal information, upon receipt of the originating terminal information; and a non-transfer notification section that notifies a user of one's own terminal equipment of the effect that one's own terminal equipment does not receive the audio data, when the decision section decides that one's own terminal equipment is one concerned with the stop of transfer of the audio data.

According to the communication system of the present invention as mentioned above, the association comes to be delivered to each terminal equipment through the server equipment in timing from which the communication is begun in the communication system in the present invention by the user etc. who understand such for instance the association.

In the communication system according to the present invention as mentioned above, it is preferable that the server equipment comprises:

a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, and that the terminal equipment comprises:

a confirmation section that confirms a stop of transfer of the audio data from the originating terminal equipment to a user of one's own terminal equipment in accordance with the non-transfer confirmation information upon receipt of the non-transfer confirmation information; and an alternative audio reproducing section that reproduces other voices prescribed instead of reproduction of voice by the audio reproduction section, when the confirmation section confirms a stop of transfer of the audio data.

According to the communication system of the present invention as mentioned above, because the voice is not completely reproduced and other voices such as for instance prescribed melodies are reproduced, softening the sense of alienation etc. of the user of the terminal equipment becomes possible for the terminal equipment to which the transmission of the audio data under the communication is stopped.

In the communication system according to the present invention as mentioned above, it is preferable that at least one terminal equipment of said two or more terminal equipments constitutes another communication system including two or more terminal equipments wherein at least part of terminal equipment is different from said two or more terminal equipments, the another communication system being different from said communication system, that said at least one terminal equipment comprises a participation answer section that is asked right or wrong of participation in the communication system and answers, that each of said two or more terminal equipments comprises:

a transfer terminal input section that inputs the transfer terminal equipment through an input operation where one's own terminal equipment becomes the originating terminal equipment; and a transfer terminal notification section that notifies the server equipment of the transfer terminal equipment input by the transfer terminal input section, and that the server equipment comprises:

a participation propriety question section that receives from the terminal equipment notification of the transfer terminal equipment, and asks right or wrong of participation in the communication system to the transfer terminal equipment when the transfer terminal equipment constitutes said another communication system; and an answer setting section that obtains answer to question by the participation propriety question section and sets a terminal equipment that has returned the answer to the transfer destination setting section as the transfer terminal equipment associated with the terminal equipment that has notified the transfer terminal equipment when the answer indicates acceptable participation.

According to the communication system of the present invention as mentioned above, it is possible to ask the terminal equipment that is not participating in the communication with the communication system now for participation in the communication with the communication system.

To achieve the above-mentioned object, the present invention provides a server equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment; and a transfer restriction section that restrictively transfers the audio data to the transfer terminal equipment when the audio data transfer section transfers the audio data.

According to the server equipment of the present invention as mentioned above, it is possible to easily implement the communication system which is capable of simply communicating with only a part of terminal equipments in the broadcast data communication between two or more terminal equipments.

To achieve the above-mentioned object, the present invention provides a first terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment;

a transfer restriction section that restrictively transfers the audio data to the transfer terminal equipment when the audio data transfer section transfers the audio data; and an association data receiving section that receives association data representative of an association between the transfer terminal equipment and each of said two or more terminal equipments and sets the transfer terminal equipment to the transfer destination setting section in accordance with the association represented by the association data, the terminal equipment comprising:

an association data creating section that creates association data representative of the association in accordance with an operation;

an association data transmitting section that transmits the association data created by the association data creating section;

an audio data transmitting section that transmits the audio data;

a transferred audio data receiving section that receives the audio data transferred from the server equipment; and an audio reproducing section that reproduces in real-time the voice represented by the audio data received by the transferred audio data receiving section.

To achieve the above-mentioned object, the present invention provides a second terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment;

a transfer restriction section that restrictively transfers the audio data to the transfer terminal equipment when the audio data transfer section transfers the audio data; and a notification setting section that sets the transfer terminal equipment to the transfer destination setting section associating with the terminal equipment that notifies of the transfer terminal equipment upon receipt of notification of the transfer terminal equipment from the terminal equipment, the terminal equipment comprising:

a transfer terminal input section that inputs the transfer terminal equipment through an input operation where one's own terminal equipment becomes the originating terminal equipment;

a transfer terminal notification section that notifies the server equipment of the transfer terminal equipment that is input by the transfer terminal input section;

an audio data transmitting section that transmits the audio data;

a transferred audio data receiving section that receives the audio data transferred from the server equipment; and an audio reproducing section that reproduces in real-time the voice represented by the audio data received by the transferred audio data receiving section.

To achieve the above-mentioned object, the present invention provides a third terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment;

a transfer restriction section that restrictively transfers the audio data to the transfer terminal equipment when the audio data transfer section transfers the audio data; and a busy information transmitting section that transmits busy information indicative of the effect that other terminal equipment is the originating terminal equipment on a basis that what terminal equipment is the originating terminal equipment, to other terminal equipments excepting the originating terminal equipment, of two or more terminal equipments, the terminal equipment comprising:

a busy notification section that notifies with an image unable to specify the originating terminal equipment a user of one's own terminal equipment of the effect that other terminal equipment is the originating terminal equipment upon receipt of the busy information;

an audio data transmitting section that transmits the audio data;

a transferred audio data receiving section that receives the audio data transferred from the server equipment; and an audio reproducing section that reproduces in real-time the voice represented by the audio data received by the transferred audio data receiving section.

To achieve the above-mentioned object, the present invention provides a fourth terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment;

a transfer restriction section that restrictively transfers the audio data to the transfer terminal equipment when the audio data transfer section transfers the audio data; and a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, the terminal equipment comprising:

a confirmation section that confirms a stop of transfer of the audio data from the originating terminal equipment to a user of one's own terminal equipment in accordance with the non-transfer confirmation information upon receipt of the non-transfer confirmation information;

a non-transfer notification section that notifies a user of one's own terminal equipment of the effect that one's own terminal equipment does not receive the audio data, when the confirmation section confirms a stop of transfer of the audio data;

an audio data transmitting section that transmits the audio data;

a transferred audio data receiving section that receives the audio data transferred from the server; and an audio reproducing section that reproduces in real-time the voice represented by the audio data received by the transferred audio data receiving section.

According to first to fourth terminal equipments of the present invention as mentioned above, it is possible to easily implement the communication system which is capable of simply communicating with only a part of terminal equipments in the broadcast data communication between two or more terminal equipments. Moreover, according to the first terminal equipment of the present invention as mentioned above, it is possible to implement the communication system which is capable of restricting the other party of the communication of each communication apparatus on a batch basis. According to the second terminal equipment of the present invention as mentioned above, it is possible to implement the communication system which is capable of individually restricting the other party of the communication of each communication apparatus. According to the third terminal equipment of the present invention as mentioned above, it is possible to implement the communication system which is capable of concealing the originating terminal equipment from the user who is not the other party of the communication. According to the fourth terminal equipment of the present invention, it is possible to implement the communication system which is capable of notifying the user who is not the other party of the communication so.

As to the server equipment, the 1st terminal equipment, the 2nd terminal equipment, 3rd terminal equipment, and the 4th terminal equipment of the present invention, only the basic form is shown. The purpose to do so is to avoid overlapping. The server equipment, the 1st terminal equipment, the 2nd terminal equipment, 3rd terminal equipment, and the 4th terminal equipment of the present invention include various forms corresponding to each form of not only the above-mentioned basic form but also the above-mentioned communication system.

BRIEF DESCRIPTION OF THE DRAWINGS

FIG. 6 is a view showing an example of a session screen on a restrictive broadcast communication.

FIG. 9 is an explanatory view useful for understanding portions of three taxi communication equipments 13a, 13b, and 13c, which belong to the taxi radio system 10, of the association represented by the association data stored in the server 12 shown in FIG. 8.

DETAILED DESCRIPTION OF PREFERRED EMBODIMENTS

Embodiments of the present invention will be described with reference to the accompanying drawings.

First of all, a first embodiment of the present invention will be explained.

A communication system according to the first embodiment of the present invention is constructed on an environment in which the telephone call of one to one and the communication of E-mail are performed mutually between many and unspecified cellular phones through a prescribed base station, and there is performed utilizing a so-called PoC a broadcast communication wherein the voice data that one cellular phone transmitted is received in the broadcast by other cellular phones between two or more cellular phones arbitrarily specified.

The communication system according to the first embodiment of the present invention is constructed when a base station establishes a communication line among four cellular phones which are previously registered in the base station, and basically performs the broadcast communication among those four cellular phones.

Figure 1:
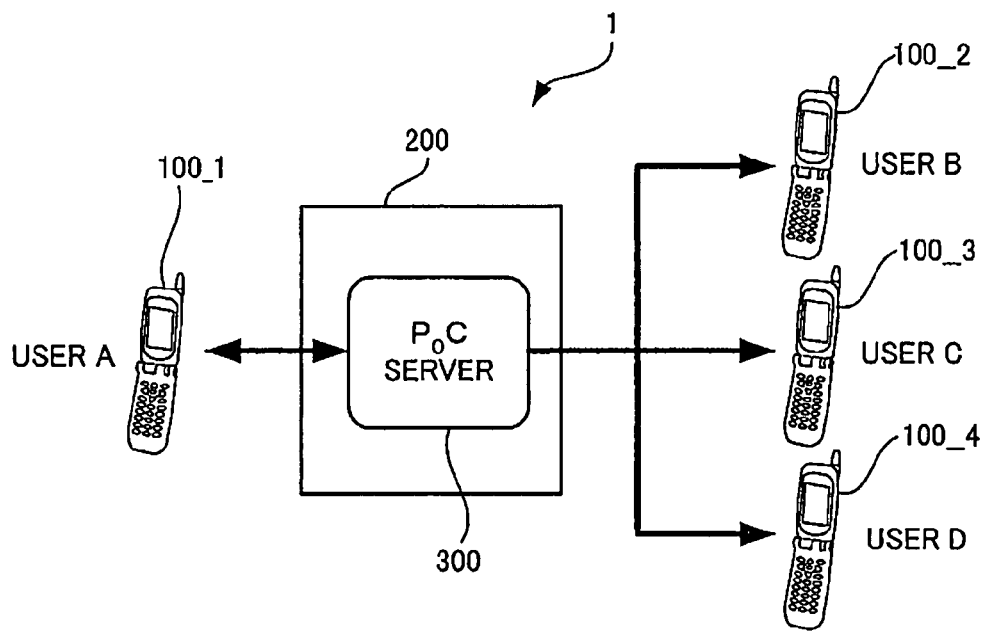
FIG. 1 is a typical illustration of a communication system according to a first embodiment of the present invention.

FIG. 1 is a typical illustration of a communication system according to a first embodiment of the present invention.

A communication system 1 shown in FIG. 1 comprises four cellular phones 100_1, 100_2, 100_3, and 100_4, and one base station 200. The communication system 1 is constructed in such a way that when a session demand signal, which will be described later, is sent from either of cellular phone of these four cellular phones 100_1, 100_2, 100_3, and 100_4, PoC server 300 prepared for in the base station 200 receives the session demand signal, so that the communication line is established among the four cellular phones 100_1, 100_2, 100_3, and 100_4. According to the communication system of the first embodiment of the present invention, telephone numbers of the four cellular phones 100_1, 100_2, 100_3, and 100_4 are stored beforehand in the PoC server 300, and communication system 1 is constructed by using these telephone numbers.

According to the communication system 1, the PoC server 300 accepts the demand of the right (speaker right) to transmit the voice data from each of the cellular phones, and gives the speaker right to the cellular phone that did the demand most ahead. Thus, the voice data, which is generated from the cellular phone having the speaker right, is transferred by the PoC server 300 to other three cellular phones on a broadcast basis. Such a broadcast communication makes it possible to perform a broadcast session that the other three users hear the one user's speech at the same time among users of four cellular phones 100_1, 100_2, 100_3, 100_4. For example, as shown in FIG. 1, when the speaker right is given to the cellular phone 100_1 of user A while holding the session that makes user A, user B, user C, and user D a session member, the voice data that the cellular phone 100_1 generated is transmitted to the other three users' cellular phones 100_2, 100_3, 100_4 in the broadcast.

When the user of the cellular phone that has the speaker right finishes the speech, the speaker right is restored to the PoC server 300, and the acquisition of the speaker right in other cellular phones becomes possible. According to the communication system 1 shown in FIG. 1, the acquisition and the restoration of the speaker right as mentioned above are repeated between two or more cellular phones while holding the session, so that the voice interaction among the session members becomes possible.

According to the communication system 1, the broadcast communication through the PoC server 300 as mentioned above is basically performed. According to the communication system 1, it is possible to perform the restrictive broadcast communication in which destination is restricted and then audio data is transferred to the restricted one, but not transfer of audio data from one cellular phone having the speaker right to other all three cellular phones. Hereinafter, the broadcast communication, in which audio data from one cellular phone having the speaker right is transferred to other all three cellular phones, is referred to as the usual broadcast communication to the restrictive broadcast communication.

According to the communication system 1, the communication system immediately after beginning of the session is the usual broadcast communication. In the usual broadcast communication, when one cellular phone having the speaker right receives from a user an instruction operation that directs the effect to switch the communication system from the usual broadcast communication to the restrictive broadcast communication, the cellular phone, which received the instruction operation, generates a switching signal representative of the switching instruction. Upon receipt of the switching signal, the PoC server 300 switches the communication system to the restrictive broadcast communication. In the restrictive broadcast communication, when one cellular phone having the speaker right receives from a user an instruction operation that directs the effect to switch the communication system from the restrictive broadcast communication to the usual broadcast communication, the cellular phone, which received the instruction operation, generates a switching signal representative of the switching instruction. Upon receipt of the switching signal, the PoC server 300 switches the communication system to the usual broadcast communication. In the manner as mentioned above, according to the communication system 1, the communication system can be switched by the operation of the user's instruction to one cellular phone having the speaker right under any communication system of the above-mentioned two kinds of communication systems.

Next, there will be explained a hardware structure of the cellular phones which constitute the communication system 1. The four cellular phones 100_1, 100_2, 100_3, 100_4 have the same structure, and thus there will be explained one cellular phone 100 having the same structure.

Figure 2:
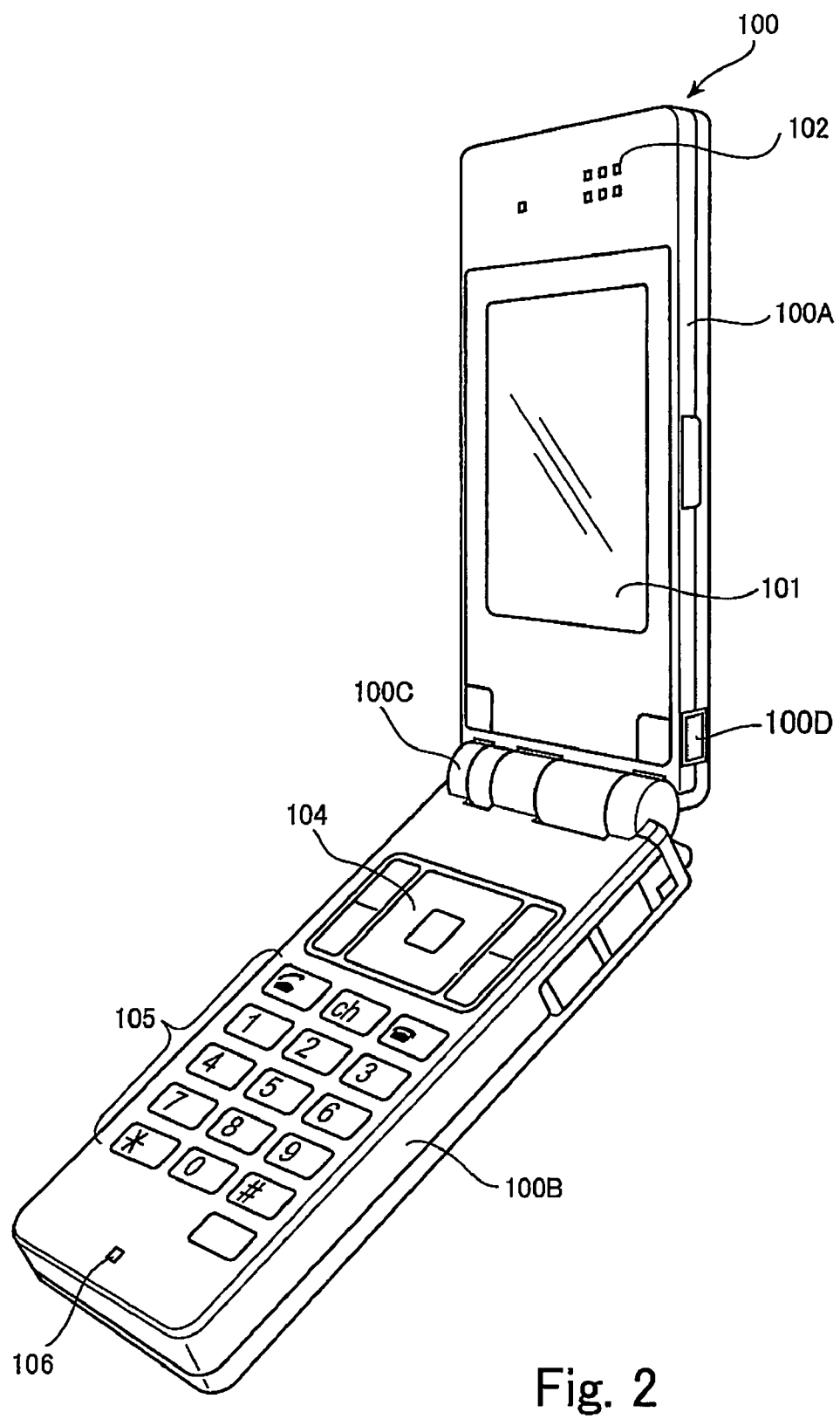
FIG. 2 is a perspective view of a cellular phone 100.

FIG. 2 is a perspective view of a cellular phone 100.

According to the cellular phone 100 shown in FIG. 2, an upper case member 100A which a user applies to the ear when talking over the telephone and a lower case member 100B which the user has by the hand are coupled with one another in such a manner that the cellular phone 100 is freely fold double on a hinge 100C.

The upper case member 100A is provided with a liquid crystal panel 101 for displaying a menu screen, photographic images and the like, and an earpiece slot 102 for transmitting voice generated from an internal speaker that is incorporated into the upper case member 100A. At the side of the upper case member 100A, there is provided a talking switch 100D which is to be depressed when voice data is transmitted at the time of the above-mentioned session.

The lower case member 100B is provided with selection buttons 104 which serve as buttons for selection of various functions and a shutter button for photography, a push button 105 for inputting telephone numbers and the like, and a mouthpiece slot 106 for transmitting voice to a microphone that is incorporated into the lower case member 100B.

Next, there will be explained an internal structure of cellular phone 100.

Figure 3:
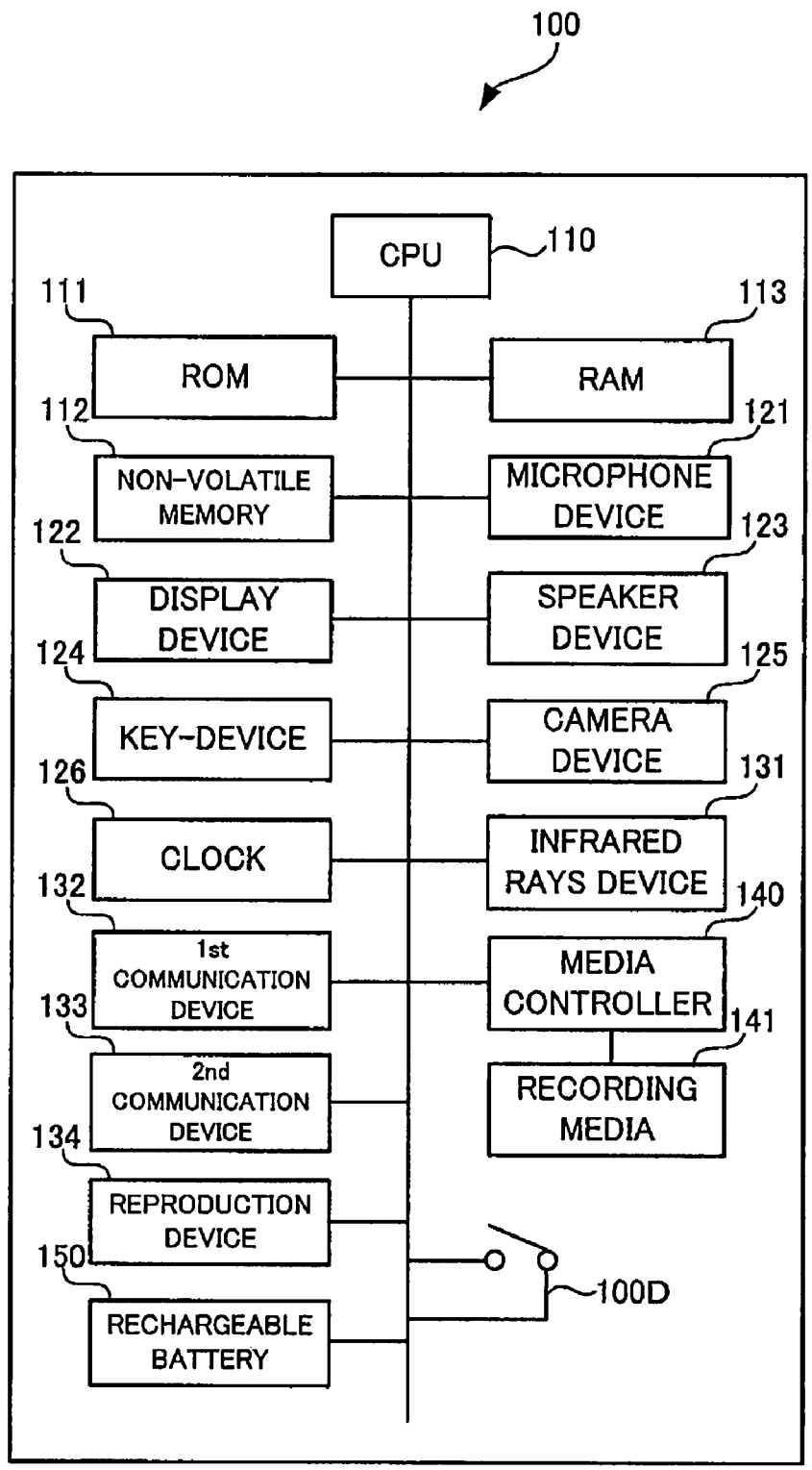
FIG. 3 is an internal block diagram of the cellular phone 100.

FIG. 3 is an internal block diagram of the cellular phone 100.

The cellular phone 100 comprises CPU 110, ROM 111, a non-volatile storage 112, RAM 113, a microphone device 121, a display device 122, a speaker device 123, a key device 124, a camera device 125, a clock 126, an infrared rays device 131, a 1st communication device 132, a 2nd communication device 133, a reproduction device 134, a media controller 140, and a battery charger 150. Those elements are coupled with one another via a bus. The cellular phone 100 further comprises the talking switch 100D which is shown in FIG. 2.

The CPU 110 has a function of executing various types of programs, and controls the cellular phone 100 in its entirety.

The ROM 111 stores various types of programs to be executed in the CPU 110 and various types of constants necessary for execution of those various types of programs. The CPU 110 executes the programs stored in the ROM 111 while the RAM 113 is used as a working area.

The non-volatile storage 112 stores various types of information, such as the address book and the received E-mail, which can be rewritten.

The microphone device 121 has a microphone for picking up user's voice, and has a function of processing the voice picked up with the microphone.

The speaker device 123 has a speaker for outputting voices to a user, and has a function of generating an audio signal to drive the speaker.

The camera device 125 has a function of collecting image data of photography. The display device 122 has a function of displaying images onto the liquid crystal panel 101 (cf. FIG. 2). The key device 124 has a function of detecting key operation by a user. The clock 126 has a function of acquiring the current time.

The media controller 140 has a function of reading out data from a recording media 141 mounted on the cellular phone 100, and writing into the recording media 141 image data generated in the camera device 125.

The infrared rays device 131 has a function of transmitting image and telephone number, etc. to external equipment in short distance through an infrared data communication without the base station 200.

The 1st communication device 132 has a function of performing a communication of telephone call and E-mail one to one via the base station 200 shown in FIG. 1, and adopts a high reliability communication system (in the present embodiment, TCP/IP) with high reliability in which processing of sending again etc. when the error occurs are decided.

The 2nd communication device 133 has a function of performing a broadcast communication with other two or more cellular phones via the PoC server 300 shown in FIG. 1. According to the 2nd communication device 133, basically, audio data is communicated in accordance with a high speed communication system (in the present embodiment, UDP) contributing to higher speed for processing wherein re-transmission processing when errors occur are omitted, but when errors occur, it happens that various types of data are transmitted in accordance with the high reliability communication system mentioned above.

Basically, the cellular phone 100 is constructed in the manner as mentioned above.

An aspect of the communication system 1 shown in FIG. 1 as one embodiment of the present invention resides in the function of the broadcast communication which is implemented by the cellular phone 100 and the PoC server 300.

Next, there will be explained the function of the broadcast communication.

Figure 4:
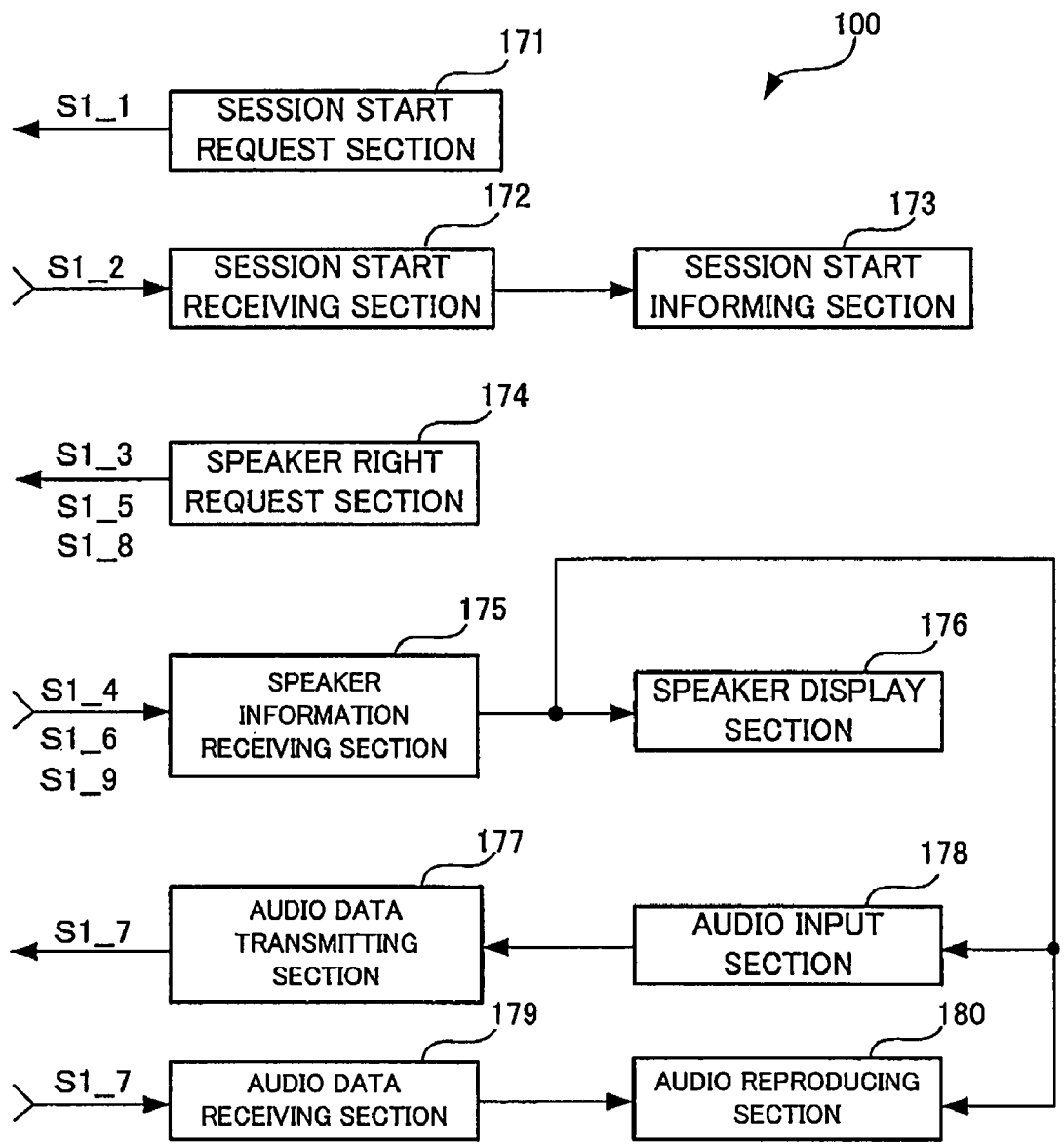
FIG. 4 is a functional block diagram useful for understanding a broadcast communication function of the cellular phone 100 shown in FIG. 2.
Figure 5:
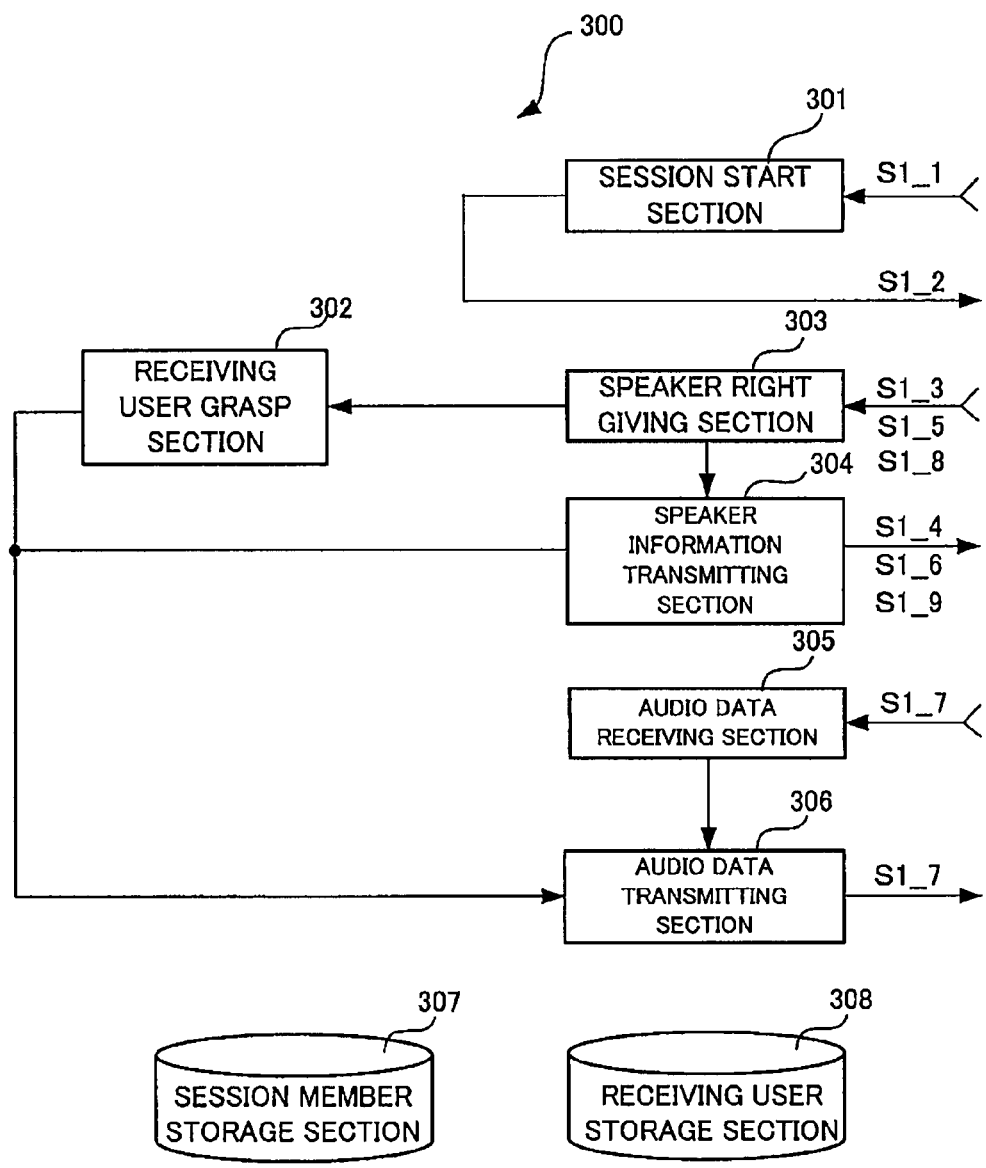
FIG. 5 is a functional block diagram useful for understanding a broadcast communication function of the PoC server 300 shown in FIG. 1.

FIG. 4 is a functional block diagram useful for understanding a broadcast communication function of the cellular phone 100 shown in FIG. 2. FIG. 5 is a functional block diagram useful for understanding a broadcast communication function of the PoC server 300 shown in FIG. 1.

The cellular phone 100 shown in FIG. 4 has a function of transmitting to the PoC server 300 audio data representative of voice from a user when a demand for the speaker right is accepted, and a function of reproducing voice represented by the audio data transmitted from the PoC server 300. The cellular phone 100 corresponds to an example of the terminal equipment of the present invention. The cellular phone 100 comprises a session start request section 171, a session start receiving section 172, a session start informing section 173, a speaker right request section 174, a speaker information receiving section 175, a speaker display section 176, an audio data transmitting section 177, an audio input section 178, an audio data receiving section 179, and an audio reproducing section 180.

The PoC server 300 shown in FIG. 5 gives the speaker right to the cellular phone 100 that has demanded the speaker right most ahead. And, in case of the session according to the restrictive broadcast communication, the PoC server 300 transmits the audio data from the cellular phone 100 to the destination that is determined on the cellular phone 100 beforehand. The PoC server 300 corresponds to the embodiment of the server equipment of the present invention. The PoC server 300 comprises a session start section 301, a receiving user grasp section 302, a speaker right giving section 303, a speaker information transmitting section 304, an audio data receiving section 305, an audio data transmitting section 306, a session member storage section 307, and a receiving user storage section 308.

Next, there will be explained structural elements of the PoC server 300 and the cellular phone 100 in accordance with the flow of processing from a request of the session start to the reproduction of the voice.

In the session start, the session start request section 171 of a desired one of four the cellular phones 100 shown in FIG. 1 receives a predetermined operation from a user and transmits a session demand signal S1_1 to the PoC server 300. According to the present embodiment, the identification names are applied to the communication system 1 of FIG. 1, and the session member storage section 307 of the PoC server 300 stores the list of the telephone number of the above-mentioned four cellular phones 100 in association with the identification names. The identification names of the communication system 1 are included in the session demand signal S1_1.

The session start section 301 of the PoC server 300 receives the session demand signal S1_1. The session start section 301 retrieves in the session member storage section 307 by the identification name included in the session demand signal S1_1, and acquires the list of the telephone numbers of the cellular phones 100 associated with the identification name. Next, the session start section 301 establishes lines on individual cellular phones 100 of the telephone numbers of the list acquired from the session member storage section 307, and transmits to individual cellular phones 100 a session start signal S1_2 to the effect that sessions by those cellular phones 100 start. According to the present embodiment, the name of the user of the cellular phone of the telephone number is associated with each telephone number, and a name all session members is shown in the session start signal S1_2. In addition, it is shown so about the user of cellular phone 100 that did not connect the line by busy when the above-mentioned line is established.

According to the present embodiment, as a method of starting the session, there is disclosed a method in which the session start section 301 establishes the lines using the telephone numbers of the cellular phones 100, that is, a method in which lines are directly established for the cellular phones 100 from the PoC server side. However, the present invention is not restricted to the present embodiment. In the general cellular phones, there are a lot of one for which a prescribed preparation is necessary for the connection to the IP network. As a method of starting the session for such cellular phones, it is acceptable to adopt a method wherein first the PoC server instructs the connection to each cellular phone without the IP network, and thereafter the line is established for the PoC server from the individual cellular phone side via a preparation of the connection to the IP network in the individual cellular phone. According to this method, the PoC server transmits an instruction signal for instructing the connection to individual cellular phones in a signal format, such as SMS (short message service), in which the signal can be received by the cellular phone without the IP network. As a result, the individual cellular phones, which received the instruction signal, execute a preparation of the connection to the IP network, and then the individual cellular phones are connected to the PoC server via the IP network so that there is established a line between the PoC server and individual cellular phones via the IP network.

The session start receiving section 172 of individual cellular phones 100 receives the session start signal S1_2 and transfers the same to the session start informing section 173. The session start informing section 173 causes the liquid crystal panel 101 shown in FIG. 2 to display a session screen for notifying a user of the start of session in accordance with the session start signal S1_2. The session screen corresponds to the usual broadcast communication that is a communication system immediately after the session start. The session screen is a screen where a part of the session screen corresponding to the restrictive broadcast communication is omitted, which is displayed when the communication system is switched to the restrictive broadcast communication as will be mentioned later. Thus, in the following, the session screen of the restrictive broadcast communication is typically shown and the explanation will be continued.

FIG. 6 is a view showing an example of a session screen on the restrictive broadcast communication.

A session screen 181 shown in FIG. 6 has: a user column 181a in which names of all session members are described in form of the name of owner of the cellular phone 100; a receiving user column 181b; and a speaker column 181c. On the session screen 181, a column, which is associated with a user of the cellular phone 100 that is not connected in the line, is displayed with gray. The session screen on the usual broadcast communication is a screen in which the receiving user column 181b is omitted from the session screen 181 shown in FIG. 6.

When a user, who whishes to have a speech, depresses the talking switch 100D of one's cellular phone 100 after the session starts, the speaker right request section 174 of the cellular phone 100 transmits to the PoC server 300 a speaker right request signal S1_3 to request the speaker right. The telephone number of the cellular phone 100 that transmits the speaker right request signal S1_3 is appended to the speaker right request signal S1_3.

The speaker right giving section 303 of the PoC server 300 receives the speaker right request signal S1_3 from individual cellular phones 100. The speaker right giving section 303 determines giving of the speaker right to the cellular phone 100 of the telephone number to which the earliest speaker right request signal S1_3 of the speaker right request signals S1_3 from individual cellular phones 100 is appended. When the speaker right giving section 303 determines giving of the speaker right in the manner as mentioned above, the speaker right giving section 303 notifies the speaker information transmitting section 304 of the name of the user of the cellular phone 100, and the speaker information transmitting section 304 transmits to the cellular phone 100 a speaker notification signal S1_4 that notifies the effect that the speaker right is given to the cellular phone 100. The cellular phone 100 of the speaker to which the speaker right is given corresponds to the example of the originating terminal equipment referred to in the present invention.

In the cellular phone 100 having the speaker right, the speaker information receiving section 175 receives the speaker notification signal S1_4 from the speaker information transmitting section 304. Upon receipt of the speaker notification signal S1_4, the speaker information receiving section 175 notifies the speaker display section 176 of the effect that the speaker right is acquired. The speaker display section 176 informs the user of acquisition of the speaker right via the usual session screen, and in addition displays a message inquiring as to whether the communication system is switched. Here, because the communication method immediately after beginning of the session is usual broadcast communication, this inquiry becomes an inquiry whether the communication method is switched from usual broadcast communication to restrictive broadcast communication.

According to the present embodiment, there is disclosed an example in which the session beginning is always performed by the usual broadcast communication, and then a user operation is performed properly so that the communication method is switched. However, the present invention is not restricted to the embodiment. It is acceptable to adopt a scheme that the session beginning is performed by the communication method which is determined for each communication system beforehand, and the communication method is maintained in the session of the communication system. According to such a scheme, a discrimination name on the communication system denotes the communication method too, and there is adopted such a method that when a user requests the session start using the discrimination name, the PoC server side executes the session start according to the communication method indicated by the discrimination name. According to this scheme, there is no need of switching of the communication method.

According to the present embodiment, there are displayed a switching selection button for selecting switching of the communication method and a maintenance selection button for selecting the maintenance of the communication method as well as the message. When a user clicks the maintenance selection button, the speaker right request section 174 transmits to the PoC server 300 a switching signal S1_5 indicative of the effect that the communication method is not to be switched. On the other hand, when a user clicks the switching selection button, the speaker right request section 174 transmits to the PoC server 300 the switching signal S1_5 indicative of the effect that the communication method is to be switched.

The speaker right giving section 303 of the PoC server 300 receives the switching signal S1_5 transmitted from the cellular phone 100 having the speaker right. The speaker right giving section 303 judges this communication method is concerned with either the usual broadcast communication or the restrictive broadcast communication from this switch signal S1_5, and informs the speaker information transmission section 304 and the receiving user grasp section 302 of the judgment result. Further, the speaker right giving section 303 informs the speaker information transmission section 304 and the receiving user grasp section 302 of the telephone number of the cellular phone 100 having the speaker right.

According to the present embodiment, regarding the restrictive broadcast communication, it is designed by for example a system engineer that when individual cellular phones 100 become the cellular phone 100 having the speaker right, the cellular phones 100 of the receiving users who receive the audio data from the speaking user are decided beforehand. The cellular phones 100 of the receiving users correspond to the example of the transfer terminal equipment referred to in the present invention. The receiving user storage section 308 of the PoC server 300 stores therein receiving association data indicative of the association (the receiving user association) between the cellular phone 100 having the speaker right and the cellular phones 100 of the receiving users with the telephone numbers of individual cellular phones 100. The receiving association data corresponds to the example of the association data referred to in the present invention, and the receiving user storage section 308 corresponds to the example of the transfer destination setting section referred to in the present invention.

In the event that the receiving user grasp section 302 is informed from the speaker right giving section 303 of the effect that the present communication method is the restrictive broadcast communication, when the receiving user grasp section 302 is informed from the speaker right giving section 303 of the telephone number of the cellular phone 100 having the speaker right, the receiving user grasp section 302 retrieves the receiving user storage section 308 using the informed telephone number to grasp the cellular phone 100 of the receiving user associated with the cellular phone 100 having the speaker right. The receiving user grasp section 302 transfers the telephone number of the cellular phone 100 of the receiving user thus grasped to the speaker information transmitting section 304 and the audio data transmitting section 306. On the other hand, in the event that the receiving user grasp section 302 is informed of the effect that the present communication method is the usual broadcast communication, the receiving user grasp section 302 transfers the telephone numbers of all three cellular phones 100 excepting the cellular phone 100 having the speaker right, of four cellular phones 100 which belong to the communication system 1, in form of the telephone number of the cellular phone 100 of the receiving user, to the speaker information transmitting section 304 and the audio data transmitting section 306. The receiving user grasp section 302 corresponds to the example of the transfer restriction section referred to in the present invention.

When the speaker information transmitting section 304 is informed of the present communication method and telephone numbers of the cellular phone 100 having the speaker right and the cellular phones 100 of the receiving users, the speaker information transmitting section 304 creates, for other cellular phones 100 excepting the cellular phone 100 having speaker right, a speaker information S1_6 indicative of the present communication method and the effect that another cellular phone 100 has now the speaker right.

The speaker information S1_6 has a method column for describing communication methods, a speaker column for describing user's names having a speaker right, and a receiving user column for describing user's names as a receiving user.

In the event that the present communication method is of the usual broadcast communication, the speaker information transmitting section 304 creates the speaker information S1_6 in which the method column describes therein the usual broadcast communication, the speaker column describes therein a user's name having a speaker right, and the receiving user column describes therein a blank. The speaker information transmitting section 304 transmits the speaker information S1_6 thus created to four cellular phones 100 all that belong to the communication system 1 of FIG. 1.

On the other hand, in the event that the present communication method is of the restrictive broadcast communication, the users who are participating in the session separate into three parties of the speaker who is the owner of cellular phone 100 having the speaker right that sends the voice data, the speaker who is the owner of cellular phone 100 that receives the voice data that has been transmitted, and non-receiver who is the owner of cellular phone 100 that doesn't receive the voice data from the speaker.

In case of the restrictive broadcast communication, the speaker information transmitting section 304 creates two kinds of speaker information S1_6 on speaker information S1_6 for the receiver and speaker information S1_6 for non-receiver.

According to the speaker information S1_6 for the receiver, the method column describes therein the restrictive broadcast communication, the speaker column describes therein a user's name having a speaker right, and the receiving user column describes therein receiving users. The user's name as the speaker indicates the effect that the associated cellular phone 100 has the speaker right. On the other hand, according to the speaker information S1_6 for non-receiver, the method column describes therein the restrictive broadcast communication, the speaker column describes therein a blank, and the receiving user column describes therein blank. Description of no user's name as the speaker indicates the effect that any one of the associated cellular phone 100 has the speaker right. Those two kinds of speaker information S1_6, which are created when the restrictive broadcast communication is concerned, correspond to an example of the busy information referred to in the present invention.

The speaker information transmitting section 304 transmits those two kinds of speaker information S1_6 to the cellular phone 100 having the speaker right and the cellular phone 100 of the non-receiver, respectively. The speaker information transmitting section 304 transmits the speaker information S1_6 for the receiver to the cellular phone 100 having the speaker right too. The speaker information transmitting section 304 corresponds to the example of the busy information transmission section referred to in the present invention.

The speaker information receiving section 175 of the cellular phone 100 receives the above-mentioned speaker information S1_6, and discriminates as to whether the communication method described in the method column is concerned with the usual broadcast communication or the restrictive broadcast communication. The speaker information receiving section 175 informs the speaker display section 176 of the discriminated communication method. In the event that the informed communication method is concerned with the restrictive broadcast communication, the speaker display section 176 changes the session screen, which is displayed on the liquid crystal panel 101 shown in FIG. 2 at the time of beginning of the session, to the session screen 181 associated with the restrictive broadcast communication shown in FIG. 6. In the event that the informed communication method is concerned with the usual broadcast communication, the session screen, which is displayed at the time of beginning of the session, is maintained.

Next, the speaker information receiving section 175 transfers the received speaker information S1_6 to the speaker display section 176. And in addition, in the event that the speaker information receiving section 175 receives the speaker notification signal S1_4 from the speaker information transmitting section 304, the speaker information receiving section 175 permits the audio input section 178 to receive the voice at that time. In the event that the speaker information receiving section 175 does not receive the speaker notification signal S1_4, the speaker information receiving section 175 judges whether the cellular phone of oneself is the cellular phone 100 of the receiver in accordance with whether there is described the user-name in the speaker column and the receiving user column of the received speaker information S1_6. The speaker information receiving section 175 permits the reproduction of the voice for the audio reproducing section 180, only when there is described the user-name in the speaker column and the receiving user column.

The speaker display section 176 informs the user of the acquisition state of the speaker right using the above-mentioned session screen. In the event that the present session is owing to the usual broadcast communication, the session screen to be displayed at that time is omitted in the receiving user column 181b, so that the user is informed of only the name of the speaker. On the other hand, in the event that the present session is owing to the restrictive broadcast communication, the content of the notification is different according to which one the passed speaker information S1_6 is concerned with non-receiver or the receiver. In the event that the speaker display section 176 receives the speaker information S1_6 on the receiver, that is, when the cellular phone 100 of interest is the cellular phone 100 of the speaker or the receiver, the speaker display section 176 informs the users of the speaker described in the speaker column and the receiver described in the receiving user column. In the event that the speaker display section 176 receives the speaker information S1_6 on non-receiver, that is, when the cellular phone 100 of interest is the cellular phone 100 of non-receiver, the speaker column and the receiving user column are blank columns, so that the speaker and the receiver are consequentially hided secretly by the user. The speaker display section 176 corresponds to an example of the busy notification section referred to in the present invention.

Figure 7:
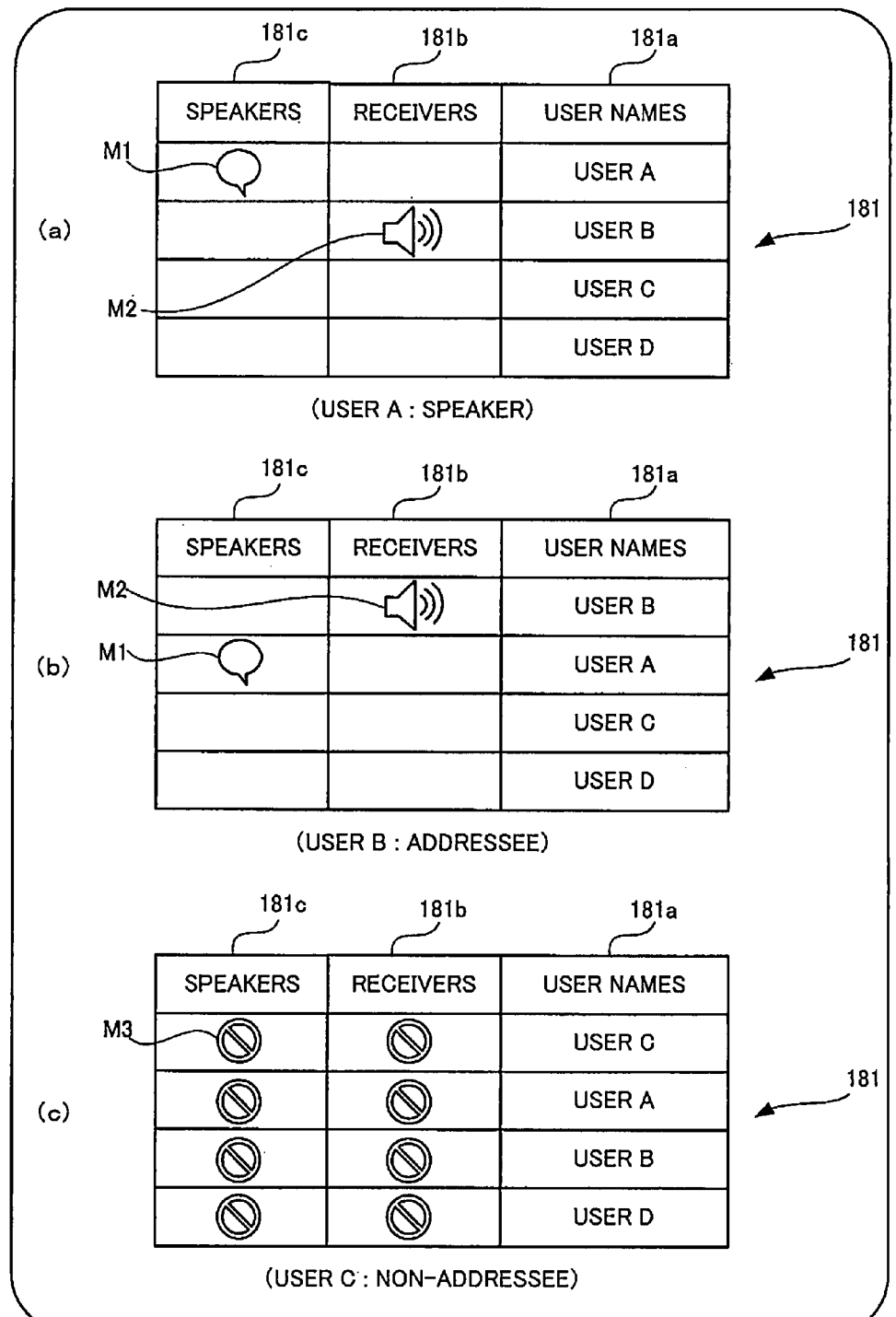
FIG. 7 is an explanatory view useful for understanding states of acquisition of speaker right on the session screen 181 on the restrictive broadcast communication shown in FIG. 1.

FIG. 7 is an explanatory view useful for understanding states of acquisition of speaker right on the session screen 181 on the restrictive broadcast communication shown in FIG. 1.

A part (a) of FIG. 7 shows a session screen 181 for a speaker. A part (b) of FIG. 7 shows a session screen 181 for a receiver. A part (c) of FIG. 7 shows a session screen 181 for a non-receiver.

In the session screen 181 for a speaker, a speaker mark M1, which implies a speaker, is filled in the uppermost stage of column corresponding to the name of the speaker described in the speaker column of the speaker information S1_6, on the speaker column 181c, and a receiver mark M2, which implies a receiver, is filled in the column corresponding to the name of the receiver described in the receiver column of the speaker information S1_6, on the receiving user column 181b.

In the session screen 181 for a receiver, the receiver mark M2 is filled in the column corresponding to the name of the receiver described in the receiver column of the speaker information S1_6, on the receiving user column 181b, and the speaker mark M1 is filled in the column corresponding to the speaker indicated by the speaker information S1_6, on the speaker column 181c.

In the session screens 181 for the speaker and the receiver, in the event that a plurality of receivers exists, the receiver mark M2 is filled in a plurality of associated columns. According to the example shown in FIG. 7, since one receiver exists, the receiver mark M2 is filled in one user's column.

In the session screen 181 for non-receiver, a mark 3 of hiding secretly that hides the speaker and the receiver secretly and shows that the speaker right is acquired in either of the cellular phone 100 now is filled in on all columns.

When giving of the speaker right is performed in the manner as mentioned above, the audio input section 178 of the cellular phone 100 of the speaker permits the receipt of the voice from the speaker information receiving section 175. When the user inputs a voice in this state, the audio input section 178 creates audio data S1_7 representative of the voice and transfers the thus created data to the audio data transmitting section 177. The audio data transmitting section 177 transmits the audio data S1_7 to the PoC server 300. The audio data transmitting section 177 corresponds to an example of the audio data transmitting section referred to in the present invention.

The audio data receiving section 305 of the PoC server 300 receives the audio data S1_7 and transfers the same to the audio data transmitting section 306. The audio data transmitting section 306 transfers the audio data S1_7 to the cellular phone 100 of the receiver transferred from the receiving user grasp section 302 using the telephone number of the cellular phone 100 of the receiver. In the event that the present session is owing to the usual broadcast communication, the audio data receiving section 305 receives from the receiving user grasp section 302 the telephone numbers of all the cellular phones 100 except the cellular phone 100 of the speaker in form of the telephone numbers of the cellular phones 100 of receiver. Thus, the audio data S1_7 is transferred to all the cellular phones 100 except the cellular phone 100 of the speaker. On the other hand, in the event that the present session is owing to the restrictive broadcast communication, the audio data S1_7 is transferred to the cellular phones 100 of the restricted receivers transferred from the receiving user grasp section 302. The audio data receiving section 305 corresponds to an example of the audio data receiving section referred to in the present invention. The audio data transmitting section 306 corresponds to an example of the audio data transmitting section referred to in the present invention.

The audio data receiving section 179 of the cellular phones 100 of the receivers receives the transferred audio data. The audio data is transferred to the audio reproducing section 180. As mentioned above, in the cellular phones 100 of the receivers, the audio reproducing section 180 is permitted in reproduction of the voice by the speaker information receiving section 175. Therefore, the audio reproducing section 180 reproduces the voice represented by the audio data. The audio data receiving section 179 of the cellular phones 100 of the receivers corresponds to an example of the transferred audio data receiving section referred to in the present invention.
The audio reproducing section 180 corresponds to an example of the audio reproducing section referred to in the present invention.

When a speaker terminates the speech and releases a speaker switch 100D, the speaker right request section 174 of the cellular phone 100 of the speaker transmits to the PoC server 300 a speaker right restoration signal S1_8 that indicates the effect to restore the speaker right. The speaker right giving section 303 of the PoC server 300 receives the speaker right restoration signal S1_8. As a result, the speaker right giving section 303 accepts the restoration of the speaker right indicated by the speaker right restoration signal S1_8 and informs the speaker information transmitting section 304 of the effect. Thus, speaker information transmitting section 304 transmits a restoration notification signal S1_9 that notifies the effect that the speaker right is restored now to all cellular phones 100. In individual cellular phones 100, the speaker information receiving section 175 receives the restoration notification signal S1_9 and transfers the same to the speaker display section 176. Upon receipt of the restoration notification signal S1_9, the speaker display section 176 informs users of the effect that the speaker right is restored now by making the speaker column and the receiver column on the session screen an empty column. As a result, the communication system 1 returns to the state before acquisition of the speaker right.

According to the communication system 1 of the present embodiment, a series of processing mentioned above in the broadcast data communication utilizing PoC makes it possible to provide such a situation that when the session by the usual broadcast communication is established, the voice entered to the cellular phone 100 having the speaker right is transferred to all other cellular phones 100, and when the session by the restrictive broadcast communication is established, the voice entered to the cellular phone 100 having the speaker right is reproduced by the transfer destination of the cellular phone 100. Particularly, in case of the later, according to the present embodiment, when a certain cellular phone 100 acquires the speaker right and becomes a cellular phone 100 of the speaker, the forwarding destination is automatically decided based on the relation between the speaker and the receiver decided beforehand depending on the system designer etc. Further, according to the present embodiment, the speaker can freely switch the communication method by the instruction operation for one's cellular phone 100 between the usual broadcast communication and the restrictive broadcast communication. More in detail, according to the communication system 1 of the present embodiment, it is possible to simply communicate with the specified cellular phones 100 in the broadcast data communication among a plurality of cellular phones 100. Further, at that time, because it is hided secretly from non-receiver who is a speaker and a receiver, it is possible to have a secret story for instance without being known in the secret story.

The above-description is concerned with the communication system 1 using the cellular phones 100, which is of the first embodiment of the present invention. It is noted, however, that the communication system 1 is applicable to a so-called taxi radio system of a taxi company, in which a radio communication is performed among a plurality of taxis in the taxi company and a management center. The taxi radio system is one in which only the session by the restrictive broadcast communication is established. A technology on the session by the restrictive broadcast communication in the communication system 1 according to the first embodiment is applied to the taxi radio system. Hereinafter, there will be explained this application.

Figure 8:
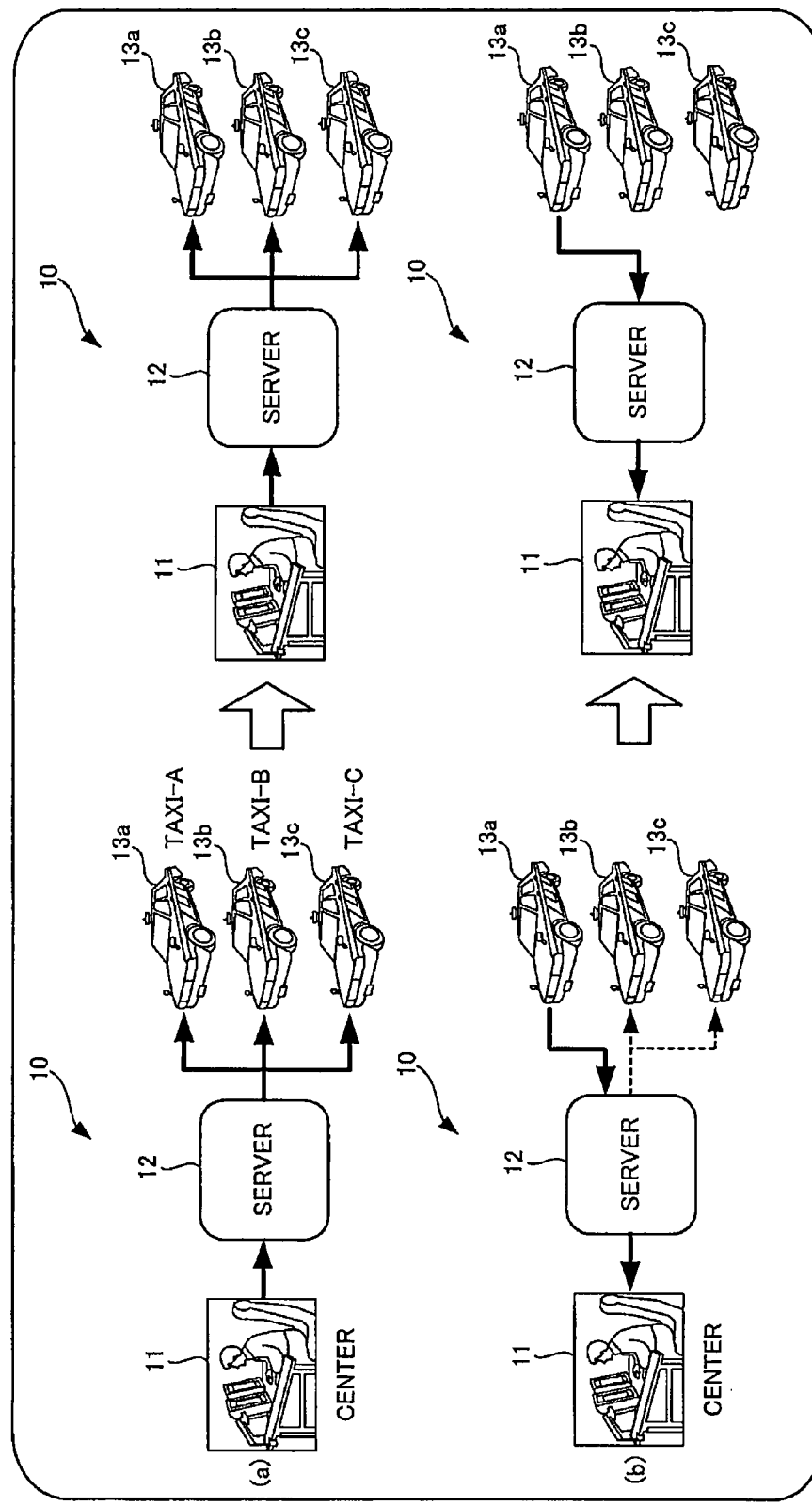
FIG. 8 is an explanatory view useful for understanding an example of an application of the communication system 1 according to the first embodiment of the present invention.

FIG. 8 is an explanatory view useful for understanding an example of an application of the communication system 1 according to the first embodiment of the present invention.

FIG. 8 typically shows a taxi radio system 10 to which the communication system 1 is applied.

The taxi radio system 10 comprises a central communication apparatus 11 and a server 12 which are set up by a management center, and three taxi communication apparatuses 13a, 13b, and 13c, which are set up by 3 taxis, respectively. The central communication apparatus 11 and three taxi communication apparatuses 13a, 13b, and 13c correspond to the cellular phones 100 in the communication system 1 according to the first embodiment. The server 12 corresponds to PoC server 300.

The server 12 constitutes the taxi radio system 10 which comprises the central communication apparatus 11 and three taxi communication apparatuses 13a, 13b, and 13c. According to the present embodiment, the taxi radio system 10 is not constructed upon receipt of the demand of the session beginning from either of communication apparatus, but is constructed in such a way that when the server 12 turns on, the communication line is automatically established among the server 12 and a taxi communication apparatus of which power source turns on at that time. According to the taxi radio system 10 shown in FIG. 8, three taxi communication apparatuses 13a, 13b, and 13c turn on when the server 12 turns on, so that the communication line is automatically established.

According to the present embodiment, the relation between the speaker and the receiver between all cabbies generalized by the management center in the taxi company and staff at the management center is decided beforehand depending on the system designer, and the correspondence data that represents the relation is memorized in a memory (not illustrated) of the server 12. For example, in the event that the taxi radio system 10 shown in FIG. 8 is constructed, the transfer of the audio data from individual communication apparatuses is executed in accordance with the portion on three taxi communication apparatuses 13a, 13b, and 13c, which belong to the taxi radio system 10, of the association represented by the correspondence data.

FIG. 9 is an explanatory view useful for understanding portions of three taxi communication apparatuses 13a, 13b, and 13c, which belong to the taxi radio system 10, of the association represented by the association data stored in the server 12 shown in FIG. 8.

According to the present embodiment, the names of the places where the session members use the communication apparatuses, that is, "Center", "Taxi A", "Taxi B" and "Taxi C" which are the names of installation features of the individual communication apparatuses, are used as the identification data of each communication apparatus. Association 12a shown in FIG. 9 is represented by a table format using the identification data of each communication apparatus. As seen from the association 12a, the receiver when the speaker is a staff at the management center is all drivers and the speaker is a driver is only a staff at the management center.

Hereinafter, there will be explained transfer processing for audio data, which is executed in accordance with the association of FIG. 9, in the taxi radio system 10 shown in FIG. 8.

Part (a) of FIG. 8 shows a state wherein the central communication apparatus 11 acquires the speaker right. Part (b) of FIG. 8 shows a state wherein the taxi communication apparatus 13a of one taxi (taxi A) acquires the speaker right.

First, there will be explained a case of the part (a) of FIG. 8 wherein the central communication apparatus 11 acquires the speaker right.

When the communication apparatus that transmitted the speaker right demand signal to the server 12 most ahead is the central communication apparatus 11, the server 12 gives the speaker right to the central communication apparatus 11. The server 12 notifies the effect that the central communication apparatus 11 acquires the speaker right according to an association 12a of FIG. 9. According to the association 12a, the receiver of the staff at the management center is all drivers. According to the communication system 1 of the first embodiment of the present invention, which is applied to the taxi radio system 10 shown in FIG. 8, the speaker is notified by the receiver and it is hided secretly by non-receiver. As a result, it is notified that the staff at the management center is a speaker all drivers. Afterwards, the voice data from the central communication apparatus 11 is transmitted to the taxi communication apparatuses 13a, 13b, and 13c all three.

Next, there will be explained a case of the part (b) of FIG. 8 wherein the taxi communication apparatus 13a of one taxi (taxi A) acquires the speaker right.

When the communication apparatus that transmitted the speaker right demand signal to the server 12 most ahead is the taxi communication apparatus 13a of the taxi A, the server 12 gives the speaker right to the taxi communication apparatus 13a of the taxi A. At that time, though the staff at the management center is notified that the driver of taxi A is a speaker, in accordance with the association 12a, this is hided secretly from other drivers and the other drivers are notified simply that the speaker right is now acquired with either of communication apparatus. And the audio data from the taxi communication apparatus 13a of taxi A is transferred to only the central communication apparatus 11.

According to the taxi radio system 10 as mentioned above, the instructions from the management center that all drivers should understand are reported to all drivers, and the communication contents from individual drivers, which are desirable to be grasped by only the management center because there is a possibility that the communication contents include client data, are reported to the management center only.

Next, there will be explained a second embodiment of the present invention.

Figure 10:
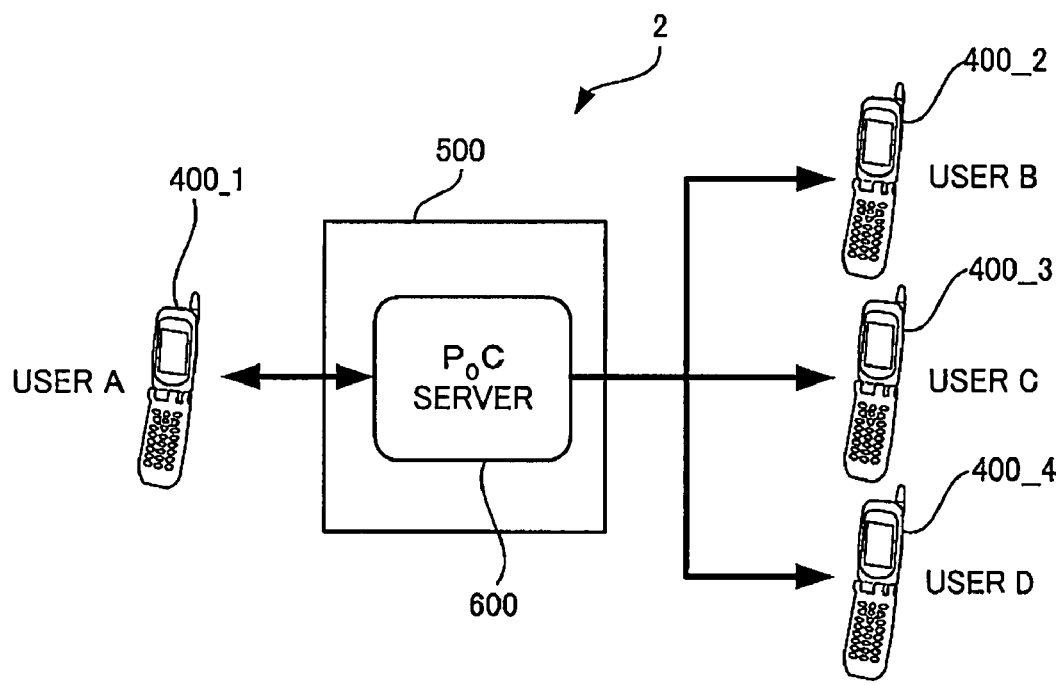
FIG. 10 is a typical illustration of a communication system according to a second embodiment of the present invention.

FIG. 10 is a typical illustration of a communication system according to a second embodiment of the present invention.

A communication system 2 shown in FIG. 10 comprises four cellular phones 400_1, 400_2, 400_3, and 400_4, and a base station 500. As for the outline of the communication system 2 and the structure of each cellular phone 400_1, 400_2, 400_3, 400_4, it is similar to the outline of the communication system 1 in the first embodiment mentioned above and the structure each cellular phone 100_1, 100_2, 100_3, 100_4, respectively. Then, the redundant explanation will be omitted in the following, and the difference points with the communication system 1 of the first embodiment will be explained.

The communication system 2 shown in FIG. 10 is different from the communication system 1 of the first embodiment in the point that regarding the restrictive broadcast communication, when association data representative of the association between the speaker and the receiver is made by either of cellular phone of cellular phones that compose the communication system 2, and a session demand signal that demands beginning the session is transmitted from the cellular phone, the association data is transmitted to PoC server 600 together with the session demand signal.

It explains the broadcast communication function of the communication system 2 paying attention to this difference point as follows. It explains four cellular phones 400_1, 400_2, 400_3, 400_4 that mutually have the same structure here by using one cellular phone 400 that has the structure.

Figure 11:
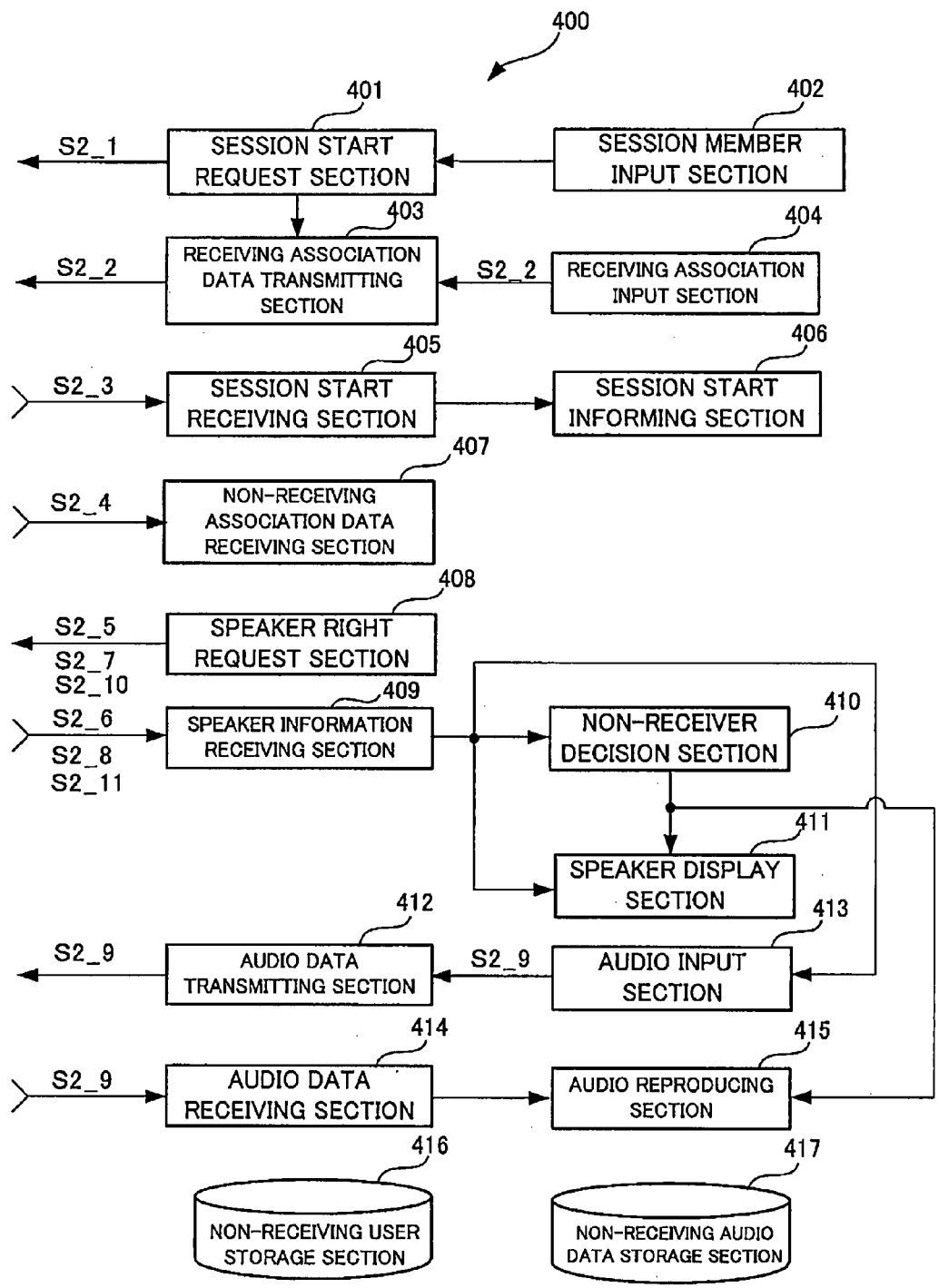
FIG. 11 is a functional block diagram useful for understanding a broadcast communication function of the cellular phone 400 shown in FIG. 10.
Figure 12:
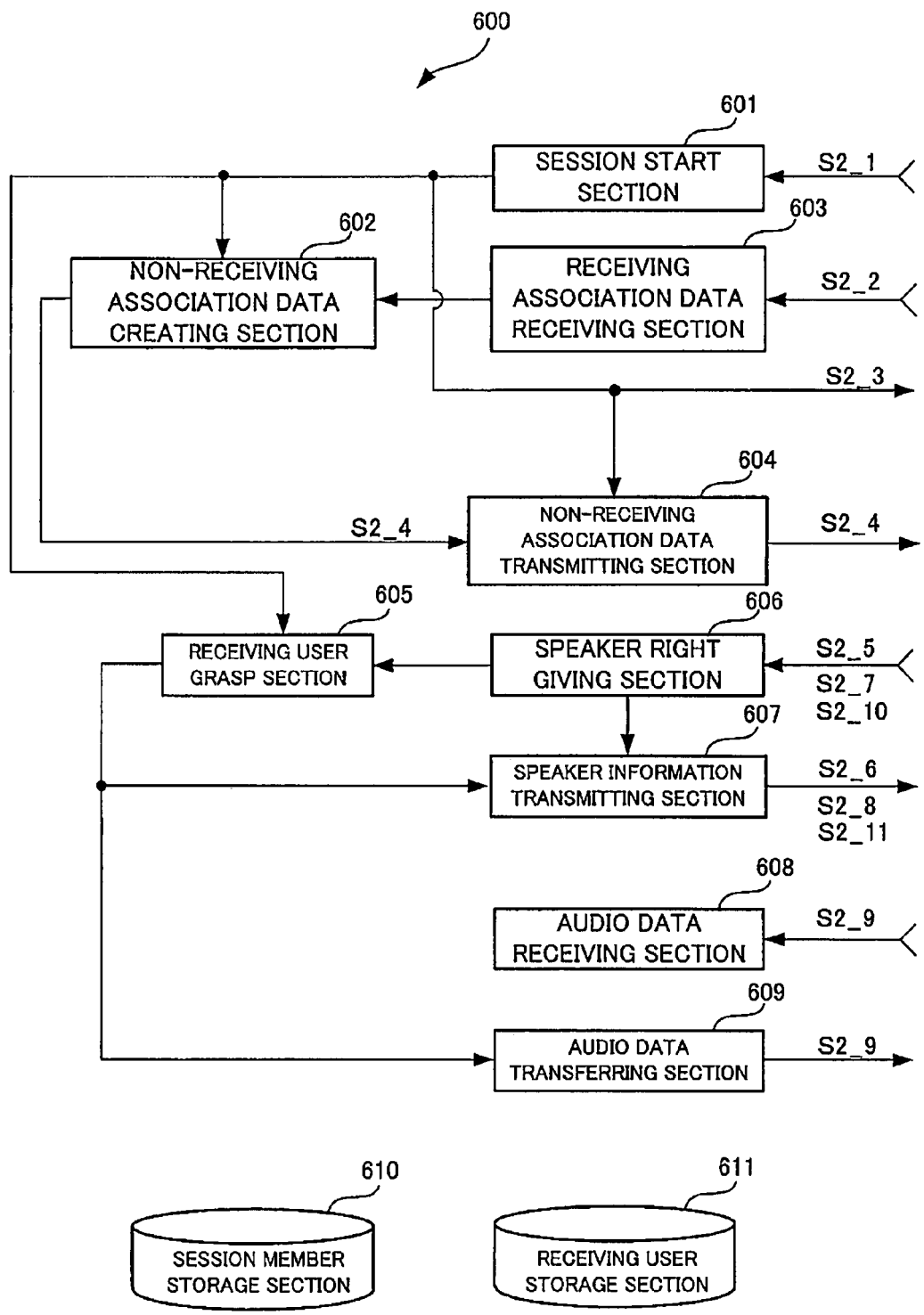
FIG. 12 is a functional block diagram useful for understanding a broadcast communication function of the PoC server 600 shown in FIG. 10.

FIG. 11 is a functional block diagram useful for understanding a broadcast communication function of the cellular phone 400 shown in FIG. 10. FIG. 12 is a functional block diagram useful for understanding a broadcast communication function of the PoC server 600 shown in FIG. 10.

The cellular phone 400 shown in FIG. 11 has: a function of generating association data on the restrictive broadcast communication upon receipt of the operation of a user and transmitting the association data to the PoC server 600 together with the session demand signal; a function of transmitting to the PoC server 600 the audio data representative of the voice from a user when a demand of the speaker right is accepted in the session beginning state; and a function of reproducing the voice represented by the audio data transmitted from the PoC server 600. The cellular phone 400 corresponds to an example of the terminal equipment of the present invention. The cellular phone 400 comprises: a session start demand section 401; a session member input section 402; a receiving association data transmitting section 403; a receiving association input section 404; a session start receiving section 405; a session start notification section 406; a non-receiving association data receiving section 407; a speaker right demand section 408; a speaker information receiving section 409; a non-receiver decision section 410; a speaker display section 411; an audio data transmitting section 412; a voice input section 413; an audio data receiving section 414; a voice reproducing section 415; a non-receiver storage section 416; and a non-receiving audio data storage section 417.

The PoC server 600 of FIG. 12 gives the speaker right to the cellular phone 400 that has demanded the speaker right most ahead, and transmits the audio data from the cellular phone 400 to receiver's cellular phone 400 in accordance with the association represented by the above-mentioned association data that has been sent from arbitrary cellular phone 400, in case of the session by the restrictive broadcast communication. The PoC server 600 of FIG. 12 corresponds to the embodiment of the server equipment of the present invention. The PoC server 600 comprises: a session start section 601; a non-receiving association data creating section 602; a receiving association data receiving section 603; a non-receiving association data transmitting section 604; a receiver grasp section 605; a speaker right giving section 606; a speaker information transmitting section 607; an audio data receiving section 608; an audio data transmitting section 609; a session member storage section 610; and a receiver storage section 611.

Hereafter, there will be explained individual structural elements of the PoC server 600 and the cellular phone 400 along the flow of processing from the demand of the session beginning to the reproduction of the voice.

According to the present embodiment, first of all, the user who hopes for the session beginning inputs the list of the user (session member) who is desired to have them participate in the session by using the telephone number of each user's cellular phone 400, and, in addition, inputs the association between the speaker and the receiver in the restrictive broadcast communication by using the telephone number of each user's cellular phone 400, in his cellular phone 400.

Figure 13:
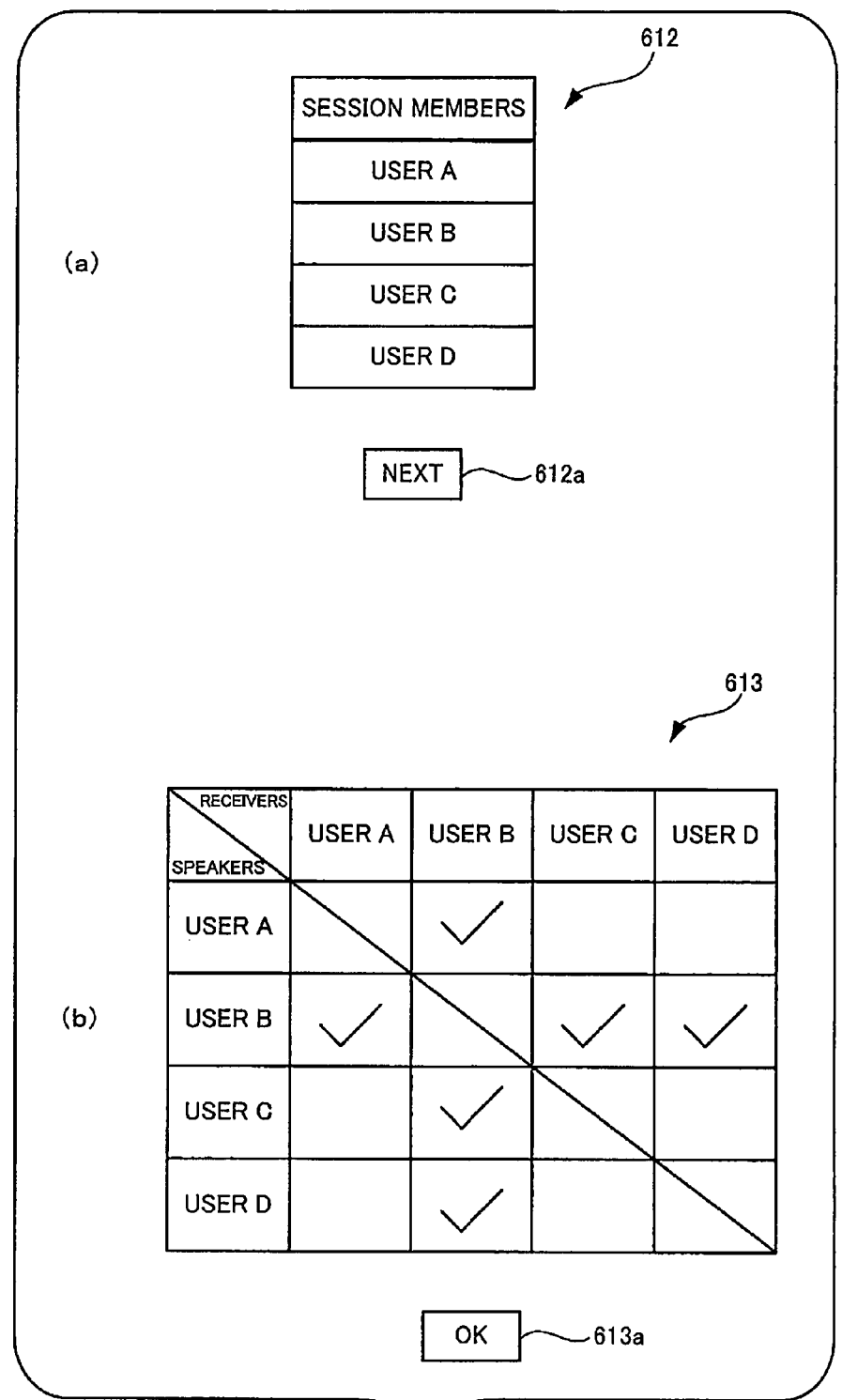
FIG. 13 is a view showing an input screen for session members and an input screen for the association between the speaking users and the receiving users.

FIG. 13 is a view showing an input screen for session members and an input screen for the association between the speaking users and the receiving users.

A part (a) of FIG. 13 shows an input screen 612 for session members. A part (b) of FIG. 13 shows an input screen 613 for the association between the speaking users and the receiving users.

The input screen 612 for session members is displayed by the session member input section 402 of FIG. 11, when a user directs an input for the session members from a prescribed menu panel.

The telephone number of the cellular phone of the user who is desired to have them participate in the session is input on the session members input screen 612. According to the present embodiment, it is possible to register by associating each user's name with the telephone number, and the telephone number with such registration is input by using user's name instead of the telephone number on the session members input screen 612.

The part (a) of FIG. 13 shows an example wherein to specify four users from user A to user D shown in FIG. 10 for a session member, each user's name is input to the session members input screen 612. The session members input screen 612 has an instruction icon 612a that directs the shift to the next screen. An input screen 613 of the association between the speaker and the receiver shown in the part (b) of FIG. 13 is displayed by the receiving association input section 404 in FIG. 11, when the instruction icon 612a is clicked after the session member is input.

The names or the telephone numbers corresponding to the above-mentioned session members are displayed to the speaker column and the receiver column on the input screen 613 for the association between the speaker and the receiver. According to the example of the part (b) of FIG. 13, the session members are displayed with the names. The receiver's specification when a certain user is made a speaker is performed on the input screen 613 by clicking the check box corresponding to the user who is desired to designate as the receiver from among two or more check boxes that queue up from the user's column in the speaker column according to the receiver column. The check mark is displayed in the check box corresponding to the user designated as the receiver. The input screen 613 for the association between the speaker and the receiver has an approval icon 613a for approving input contents. When the approval icon 613a is clicked, the input of the association is terminated.

A list of the session members thus entered is received by the session member input section 402 and then transferred to the session start demand section 401. The association between the speaker and the receiver is received by the receiving association input section 404. The receiving association input section 404 creates receiving association data S2_2 representative of the association and transfers the created receiving association data S2_2 to the receiving association data transmitting section 403. The receiving association input section 404 corresponds to an example of the association data creating section referred to in the present invention.

Next, a user operates to demand the session beginning, the session start demand section 401 generates a session demand signal S2_1 to which a list of the session members is attached, in response to the user's operation, and transmits the same to the PoC server 600. The session start demand section 401 corresponds to an example of the start demand section referred to in the present invention.

In addition, the session start demand section 401 sends the timing signal that informs them of the transmission timing of the session demand signal S2_1 to the receiving association data transmitting section 403. At that time, the receiving association data transmitting section 403 transmits the receiving association data S2_2 to the PoC server 600 in synchronism with the receipt of the timing signal from the session start demand section 401. The receiving association data transmitting section 403 corresponds to an example of the association data transmitting section referred to in the present invention.

The session start section 601 of the PoC server 600 receives the session demand signal S2_1. The session start section 601 informs the non-receiving association data creating section 602 of receipt of the session demand signal S2_1. The session start section 601 transfers to the session member storage section 610 the list of the session members attached to the session demand signal S2_1. The session start section 601 corresponds to an example of the transfer start section referred to in the present invention.

The receiving association data receiving section 603 of the PoC server 600 receives the receiving association data S2_2. The receiving association data receiving section 603 transfers the receiving association data S2_2 to the non-receiving association data creating section 602 and the receiver storage section 611. The receiving association data receiving section 603 corresponds to an example of the association data receiving section referred to in the present invention.

The session member storage section 610 and the receiver storage section 611 are reset in storage contents when the session is terminated. Thus, the session member storage section 610 always stores a list of session members on the session during the session. The receiver storage section 611 always stores the receiving association data S2_2 on the session.

The session start section 601 constructs a communication system to which two or more cellular phones 400 associated with the list of the session members belong in such a manner that communication lines are established among those cellular phones 400. The communication system 2 shown in FIG. 10 is constructed in such a manner that in either of cellular phone 400 of four cellular phones 400, the session member's list corresponding to these four cellular phones 400 is input. The session start section 601 sends to individual cellular phones 400 a session start signal S2_3 indicative of the effect that the session by users of those cellular phones 400 is started. Also in the present embodiment, in a similar fashion to that of the first embodiment, the individual telephone number is associated with the name of the user of the cellular phone 400 of the associated telephone number, and thus the session start signal S2_3 indicates the name of the session member. In addition, it is shown so about the user of cellular phone 400 that doesn't connect the line by a busy. The session start section 301 sends the timing signal that informs them of the timing of the notification for each cellular phone 400 to the non-receiving association data transmitting section 604.

Also in the present embodiment, in a similar fashion to that of the first embodiment, there is disclosed, as a method beginning of the session, a method in which a line is established directly from the PoC server for the individual cellular phone. However, the present invention is not restricted to the present embodiment. The method of beginning the session may be a method in which the PoC server directs each cellular phone the connection for instance first without the IP network, and the line is established from each cellular phone side for the PoC server.

Upon receipt of the session demand signal from the session start section 601, the non-receiving association data creating section 602 creates non-receiving association data S2_4 representative of the association between the speaker and the non-receiver using the telephone number in accordance with the receiving association data S2_2 stored in the receiver storage section 611 and the list of the session members stored in the session member storage section 610, and transfers the non-receiving association data S2_4 to the non-receiving association data transmitting section 604.

The non-receiving association data transmitting section 604 transmits the non-receiving association data S2_4 transferred from the non-receiving association data creating section 602 to each cellular phone 400. The non-receiving association data transmitting section 604 performs transmission of the non-receiving association data S2_4 in response to the timing signal from the session start section 601. The non-receiving association data transmitting section 604 corresponds to an example of the confirmation information transmission section referred to in the present invention. The non-receiving association data transmitting section 604 corresponds to also an example of the association data delivery section referred to in the present invention, since it indirectly delivers the association between the speaker and the receiver to individual cellular phones 400 in accordance with the non-receiving association data S2_4.

The individual cellular phone 400 receives the session start signal S2_3 and the non-receiving association data S2_4 as follows.

First of all, the session start signal S2_3 is received by the session start receiving section 405, and then transferred to the session start notification section 406. The session start notification section 406 displays the session screen corresponding to the usual broadcast communication on the liquid crystal panel 101 shown in FIG. 2 as well as the first embodiment based on the session start signal S2_3.

The non-receiving association data S2_4 is received by the non-receiving association data receiving section 407, and then transferred to the non-receiver storage section 416. The non-receiver storage section 416 is also to reset the storage contents when the session is terminated. Thus, the non-receiver storage section 416 stores the non-receiving association data S2_4 while the session is established. The non-receiver storage section 416 corresponds to an example of the association storage section referred to in the present invention.

Thus, when the user, who hopes for the speech, pushes the speaker switch of one's own cellular phone 400 after the session is begun, the speaker right demand section 408 of the cellular phone 400 transmits the speaker right demand signal S2_5 that demands the speaker right to the PoC server 300. The telephone number of the cellular phone 400 that transmits the speaker right demand signal S2_5 is appended to the speaker right demand signal S2_5.

The speaker right demand signal S2_5 from individual cellular phones 400 is received by the speaker right giving section 606 of the PoC server 600. The speaker right giving section 606 decides giving the speaker right to the cellular phone 400 of the telephone number appended to previous speaker right demand signal S2_5 of speaker right demand signals S2_5 from each cellular phone 400. When the speaker right giving section 606 decides the speaker right like this, the speaker right giving section 606 notifies the name of the user of the cellular phone 400 to the speaker information transmission section 607, and the speaker information transmission section 607 transmits a speaker notification signal S2_6 that notifies the effect that the speaker right is given to the cellular phone 400. The cellular phone 400 of the speaker to which the speaker right is given is an example of the originating terminal equipment referred to in the present invention.

In the cellular phone 400 of the speaker, the speaker information receiving section 409 receives the speaker notification signal S2_6 from the speaker information transmission section 607. Upon receipt of the speaker notification signal S2_6, the speaker information receiving section 409 informs the speaker display section 411 of the effect that one's own cellular phone acquires the speaker right. The speaker display section 411 informs the user of the acquisition the speaker right via the session screen associated with the usual broadcast communication, and displays a message inquiring whether the communication method is switched. Here, because the communication method immediately after beginning of the session is the usual broadcast communication, this inquiry means an inquiry whether it is to be switched from the usual broadcast communication to the restrictive broadcast communication.

Also in the present embodiment, in a similar fashion to that of the first embodiment, there are displayed a switching selection button for selecting change over of the communication method and a maintenance selection button for selecting the maintenance of the communication method, as well as the message. When a user performs an instruction operation of instructing the effect that the communication method is not changed, that is, when the user clicks the maintenance selection button, the speaker right demand section 408 transmits a switching signal S2_7 indicative of such an effect to the PoC server 600. On the other hand, when a user performs an instruction operation of instructing the effect that the communication method is changed, that is, when the user clicks the switching selection button, the speaker right demand section 408 transmits the switching signal S2_7 indicative of such an effect to the PoC server 600.

The speaker right giving section 606 of the PoC server 300 receives the switching signal S2_7 transmitted from the cellular phone 400 of the speaker. The speaker right giving section 606 discriminates the present communication method is either the usual broadcast communication or the restrictive broadcast communication from the switch signal S2_7, and informs the speaker information transmission section 607 and the receiver grasp section 605 of the judgment result. The speaker right giving section 606 also informs the speaker information transmission section 607 and the receiver grasp section 605 of the telephone number of the cellular phone 400 of the speaker.

When the receiver grasp section 605 is told that the present communication method is the restrictive broadcast communication from the speaker right giving section 606, the receiver grasp section 605 retrieves by using the transferred telephone number in the receiver storage section 611 when the telephone number of speaker's cellular phone 400 is told by the speaker right giving section 606, and understands the cellular phone 400 of the receiver associated with the cellular phone 400. The receiver grasp section 605 transfers the telephone number of the cellular phone 400 of the receiver thus understood to the speaker information transmission section 607 and the audio data transmitting section 609. On the other hand, when the receiver grasp section 605 is told that the present communication method is the usual broadcast communication, the receiver grasp section 605 transfers the telephone numbers of all the cellular phones 400 excepting the cellular phone 400 of the speaker to the speaker information transmission section 607 and the audio data transmitting section 609 in form of the telephone number of the cellular phone 400 of the receiver. The receiver grasp section 605 corresponds to an example of the transfer restriction section referred to in the present invention.

When the speaker information transmission section 607 is notified of the present communication method and the telephone numbers of the cellular phones 400 of the speaker and the receiver, the speaker information transmission section 607 creates speaker information S2_8 for all cellular phones 400. The speaker information S2_8 has a method column where the communication method is described, a speaker column where the name of the user who became the speaker is described, and a receiver column where the name of the user who became the receiver.

In the event that the present communication method is the usual broadcast communication, the speaker information transmission section 607 creates the speaker information S2_8 wherein the usual broadcast communication is described in form of the communication method in the method column, the name of the user who became the speaker is described in the speaker column, and the receiver column is an empty column, and transmits the thus created creates speaker information S2_8 to all cellular phones 400.

On the other hand, in the event that the present communication method is the restrictive broadcast communication, the speaker information transmission section 607 creates the speaker information S2_8 wherein the restrictive broadcast communication is described in form of the communication method in the method column, the name of the user who became the speaker is described in the speaker column, and the name of the user who became the receiver is described in the receiver column is an empty column, and transmits the thus created creates speaker information S2_8 to all cellular phones 400. The speaker information transmission section 607 corresponds to an example of one serving both as the originating terminal transmission section and the busy information transmission section referred to in the present invention.

The speaker information receiving section 409 of the cellular phone 400 receives the above-mentioned speaker information S2_8, first of all, confirms whether the communication method described in the method column is the usual broadcast communication or the restrictive broadcast communication, and notifies the speaker display section 411 of the confirmed communication method. In the event that the notified communication method is the restrictive broadcast communication, the speaker display section 411 alters the session screen, which is displayed on the liquid crystal panel 101 shown in FIG. 2 at the time of the session start, to the session screen 181 associated with the restrictive broadcast communication shown in FIG. 6. In the event that the communication method is the usual broadcast communication, the session screen at the time of the session start is maintained.

Next, the speaker information receiving section 409 transfers the received speaker information S2_8 to the speaker display section 411, and when the communication method is the restrictive broadcast communication, transfers the speaker information S2_8 to the non-receiver decision section 410 too. Further, the speaker information receiving section 409 permits the voice input section 413 to receive the voice when it receives the speaker notification signal S2_6.

The non-receiver decision section 410 first retrieves by the telephone number of cellular phone 400 of the speaker shown in the speaker information S2_8 in the non-receiver storage section 416, and acquires the telephone number of non-receiver's cellular phone 400 corresponding to the telephone number in the non-receiving association data S2_4. The non-receiver decision section 410 examines whether the acquired telephone number corresponds to the telephone number of one's own cellular phone and whether there is corresponding something to the telephone number of one's own cellular phone in two or more those telephone numbers when two or more telephone numbers of non-receiver's cellular phone 400 are acquired. In the event acquired telephone number corresponds to the telephone number of one's own cellular phone, or in the event that there is corresponding something to the telephone number of one's own cellular phone in two or more those telephone numbers when two or more telephone numbers of non-receiver's cellular phone 400 are acquired, the non-receiver decision section 410 decides that one's own cellular phone is non-receiver's cellular phone 400. And it is judged that one's own cellular phone is receiver's cellular phone 400 besides. The non-receiver decision section 410 notifies the speaker display section 411 and the voice reproducing section 415 of the decision result. The non-receiver decision section 410 corresponds to an example of one serving both as the decision section and the confirmation section referred to in the present invention.

The speaker display section 411 notifies a user of the acquisition situation of the speaker right by using the above-mentioned session screen. Because the content of this notification is similar to the content of the notification in the first embodiment explained referring to FIG. 7, the repetition explanation will be omitted. The speaker display section 411 corresponds to an example of one serving both as the non-transfer notification section and the busy notification section referred to in the present invention.

The voice input section 413 of the cellular phone 400 acquiring the speaker right creates voice data S2_9 representative of a voice and transfers the same to the audio data transmitting section 412 when the voice is input when the voice input is permitted. The audio data transmitting section 412 transmits the voice data S2_9 to the PoC server 600.

The audio data receiving section 608 of the PoC server 600 receives the voice data S2_9 transmitted from the speaker's cellular phone 400 and transfers it to the audio data transmitting section 609. The audio data transmitting section 609 transfers the voice data S2_9 to the receiver's cellular phone 400 associated with the telephone number transferred from the receiver grasp section 605.

The audio data receiving section 414 of the receiver's cellular phone 400 receives the transferred voice data S2_9 and transfers the same to the voice reproducing section 415. The voice reproducing section 415 reproduces the voice represented by the voice data S2_9. On the other hand, when the voice reproducing section 415 is notified from the non-receiver decision section 410 of the effect that one's own cellular phone is the non-receiver's cellular phone 400, the voice reproducing section 415 reads non-receiving audio data representative of an alternative voice when non-receiving it from the non-receiving audio data storage section 417, and reproduces the alternative voice represented by the non-receiving voice data. The reproduction of the alternative voice is continued until one's own cellular phone acquires the speaker right or until it is notified that one's own cellular phone is the receiver's cellular phone 400. The voice reproducing section 415 corresponds to an example of one serving both as the voice reproducing section and the alternative voice reproducing section referred to in the present invention.

According to the present embodiment, there is disclosed an example in which the reproduction of the alternative voice is stopped when one's own cellular phone acquires the speaker right or when it is notified that one's own cellular phone is the receiver's cellular phone. However, the present invention is not restricted to the present embodiment, and it is acceptable that the reproduction of the alternative voice is stopped when the speaker right is restored from the speaker's cellular phone to the PoC server for instance.

When the speaker finishes speeches and releases the speaker switch, the speaker right demand section 408 of the speaker's cellular phone 400 transmits a speaker right restoration signal S2_10 indicative of the effect to restore the speaker right to the PoC server 600. The speaker right giving section 606 of the PoC server 600 receives the speaker right restoration signal S2_10. Thus, the speaker right giving section 606 accepts the restoration of the speaker right indicated by the speaker right restoration signal S2_10 and informs the speaker information transmitting section 607 of the effect. The speaker information transmitting section 607 transmits to all cellular phones 400 a restoration notification signal S2_11 that notifies the effect that the speaker right is restored now. In each cellular phone 400, the speaker information receiving section 409 receives the restoration notification signal S2_11 and transfers it to the speaker display section 411. Upon receipt of the restoration notification signal S2_11, the speaker display section 411 informs the user of the effect that the speaker right is being restored by means of making the speaker column and the receiver column on the session screen an empty column. As a result, it comes to return to the state before the communication system 2 acquires the speaker right.

Also according to the communication system 2 of the second embodiment, in a similar fashion to that of the first embodiment, it is possible to easily talk by PoC to a part of cellular phone 400 only. Further according to the communication system 2 of the second embodiment, the suitable instruction of the speaker makes it possible to switch the communication method from the usual broadcast communication to the restrictive broadcast communication or makes it possible to switch the communication method from the restrictive broadcast communication to the usual broadcast communication oppositely. Furthermore according to the communication system 2 of the second embodiment, because the association between the speaker and the receiver is decided depending on the user, it is possible to flexibly set the other party of the communication in the restrictive broadcast communication. Moreover, the communication system 2 comes for the speaker to be hided secretly in the non-receiver as well as the first embodiment.

Next, there will be explained a third embodiment of the present invention.

Figure 14:
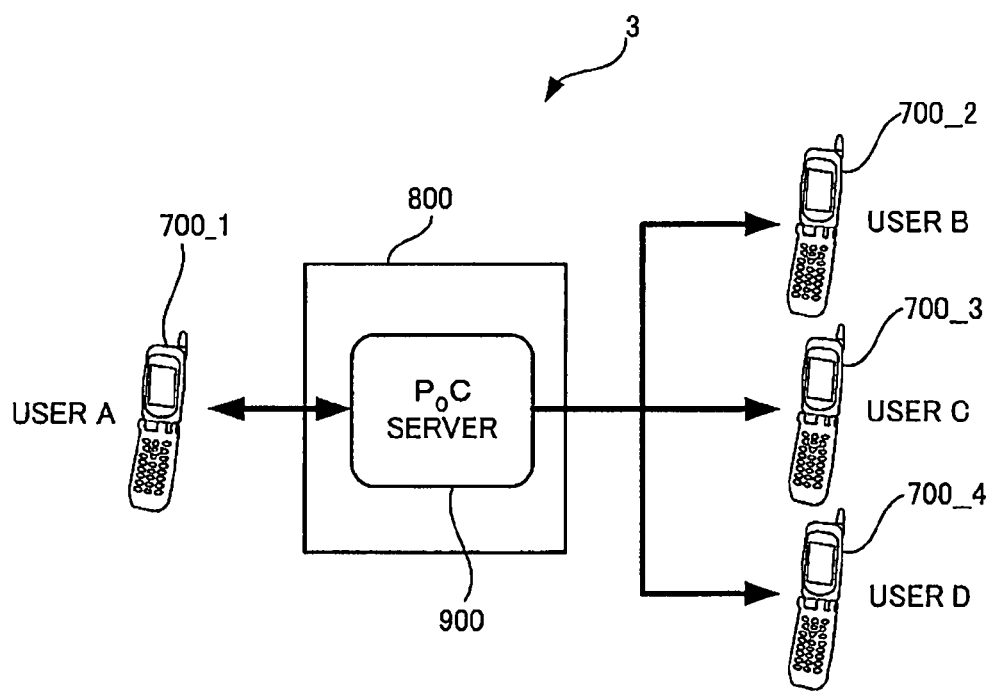
FIG. 14 is a typical illustration of a communication system according to a third embodiment of the present invention.

FIG. 14 is a typical illustration of a communication system according to a third embodiment of the present invention.

A communication system 3 shown in FIG. 3 comprises four cellular phones 700_1, 700_2, 700_3, and 700_4, and one base station 800. As for the outline of the communication system 3 and the composition of each cellular phone 700_1, 700_2, 700_3, 700_4, it is similar to the outline of communication system 1 in the first embodiment mentioned above and the composition of each cellular phone 100_1, 100_2, 100_3, 100_4. Then, the repetition explanation will be omitted, and the difference point with the communication system 1 in the first embodiment will be explained.

According to the present embodiment, in the restrictive broadcast communication, when the speaker right is demanded, a receiver where a desired cellular phone becomes a speaker's cellular phone, and one from whom the speaker is concealed, are input in the speaker's cellular phone.

For example, in the event that the cellular phone 700_1 of the user A becomes a cellular phone of the speaker, it is assumed that user B is input as a receiver when the speaker right is demanded, and user D is input as one from whom the speaker is concealed. Then, the audio data from the cellular phone 700_1 of the user A is transferred by PoC server 900 to only the cellular phone 700_2 of the user B, and is not transferred to the cellular phones 700_3 and 700_4. It is informed the users B and C that the user A is the speaker, but not informed the user D.

Hereinafter, there will be explained the broadcast communication function of the communication system 3. Here, it explains four cellular phones 700_1, 700_2, 700_3, and 700_4 that mutually have the same composition by using one cellular phone 700 that has the composition.

Figure 15:
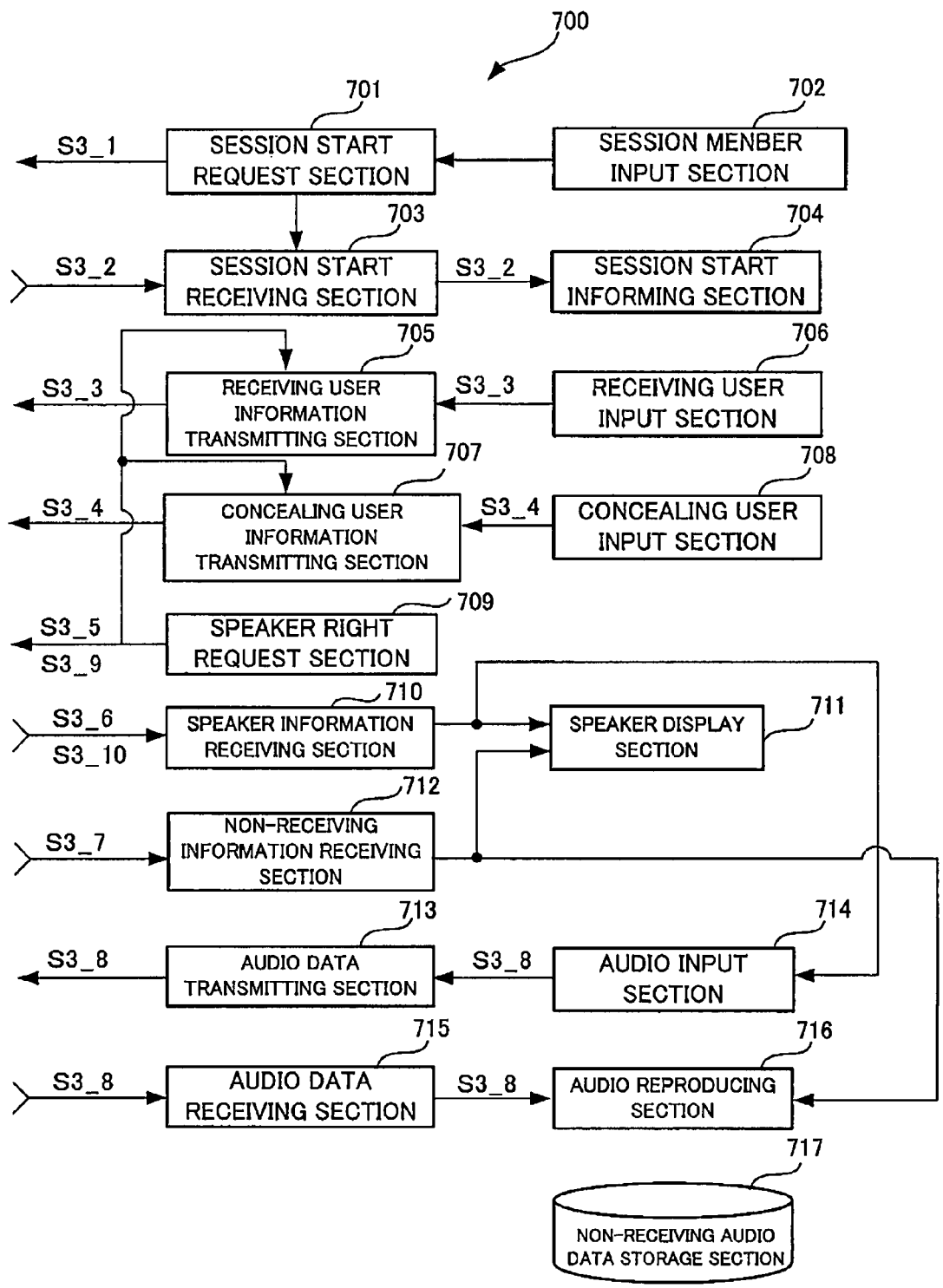
FIG. 15 is a functional block diagram useful for understanding a broadcast communication function of the cellular phone 700 shown in FIG. 14.
Figure 16:
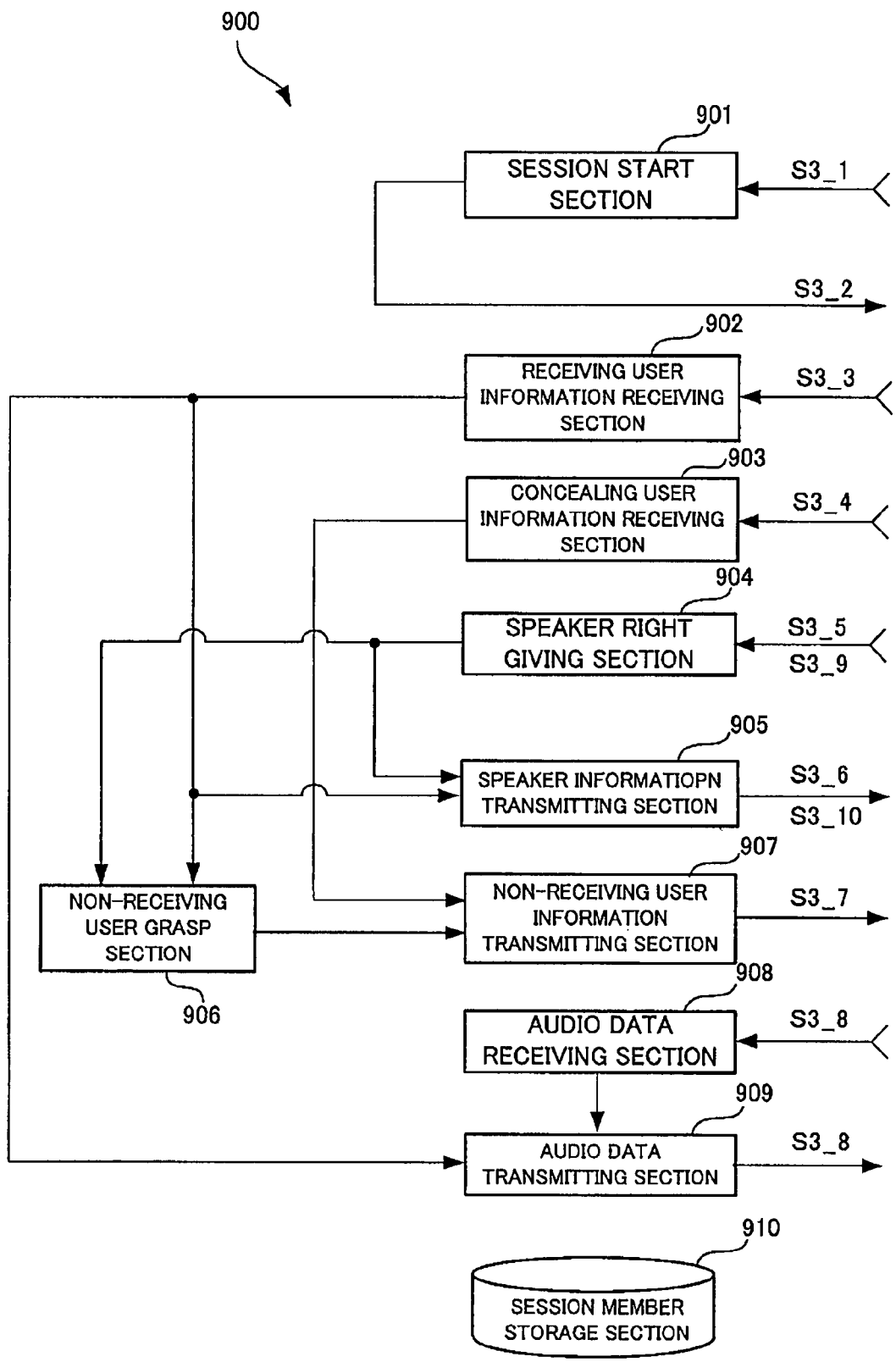
FIG. 16 is a functional block diagram useful for understanding a broadcast communication function of the PoC server 900 shown in FIG. 14.

FIG. 15 is a functional block diagram useful for understanding a broadcast communication function of the cellular phone 700 shown in FIG. 14. FIG. 16 is a functional block diagram useful for understanding a broadcast communication function of the PoC server 900 shown in FIG. 14.

The cellular phone 700 shown in FIG. 15 has in the restrictive broadcast communication a function of transmitting to the PoC server 900 together with the speaker right demand signal a receiver and one from whom a speaker is to be concealed where one's own cellular phone becomes the cellular phone of the speaker, a function of transmitting to the PoC server 900 audio data representative of voice from a user when a demand for the speaker right is accepted in the state of the session beginning, and a function of reproducing voice represented by the audio data transmitted from the PoC server 900. The cellular phone 700 corresponds to an example of the terminal equipment of the present invention. The cellular phone 700 comprises a session start request section 701, a session member input section 702, a session start receiving section 703, a session start informing section 704, a receiver information transmitting section 705, a receiver input section 706, a concealment user information transmitting section 707, a concealment user input section 708, a speaker right request section 709, a speaker information receiving section 710, a speaker display section 711, a non-receiving information receiving section 712, an audio data transmitting section 713, an audio input section 714, an audio data receiving section 715, an audio reproducing section 716, and a non-receiving audio data storage section 717.

The PoC server 900 of FIG. 14 gives the speaker right to the cellular phone 700 that has demanded the speaker right most ahead, and transmits the voice data from the cellular phone 700 to the cellular phone 700 of the receiver who has been sent from the cellular phone 700 for the session by the restrictive broadcast communication. The PoC server 900 corresponds to one embodiment of the server equipment of the present invention. The PoC server 900 comprises a session start section 901, a receiver information receiving section 902, a concealment user information receiving section 903, a speaker right giving section 904, a speaker information transmitting section 905, a non-receiver grasp section 906, a non-receiving information transmitting section 907, an audio data receiving section 908, an audio data transfer section 909, and a session member storage section 910.

Hereinafter, there will be explained structural elements of the PoC server 900 and the cellular phone 700 respectively along the flow of processing from the demand of the session beginning to the reproduction of the voice.

According to the present embodiment, first of all, the user who hopes for the session beginning inputs through his cellular phone 700 the list of the users (session members) who are desired to participate in the session by using the telephone number of each user's cellular phone 400. In addition, when the session by the restrictive broadcast communication is hoped, the user who hopes for the session beginning inputs so.

Figure 17:
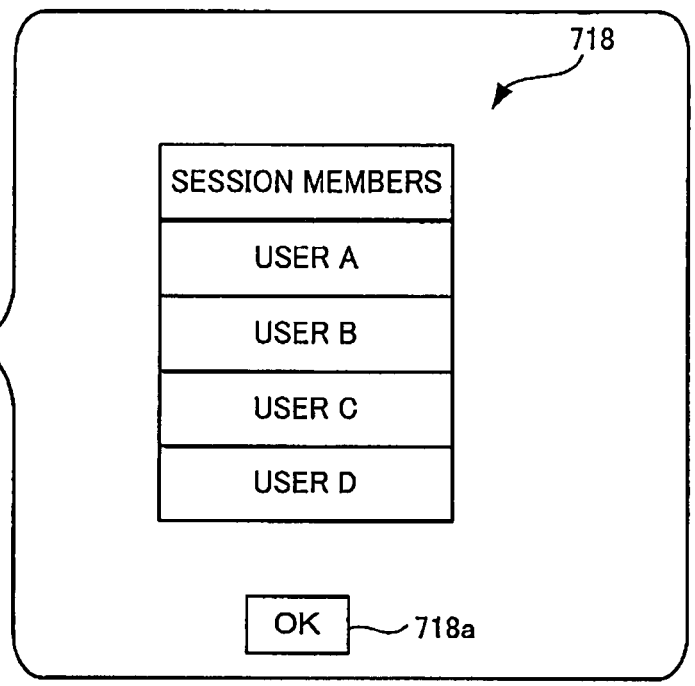
FIG. 17 is a view showing an example of an input screen for the session members.

FIG. 17 is a view showing an example of an input screen for the session members.

On a session member input screen 718, the telephone numbers of the cellular phones of the session members are input. According to the present embodiment, it is possible to register by associating owner's name with the telephone number, and the telephone number with such registration is input by using user's name instead of the telephone number on the session member input screen 718.

To input the telephone number of a cellular phone of four people from user A to user D shown in FIG. 14, as a session member, FIG. 17 shows the example in which each user's name is input to the session member input screen 718. In addition, the session member input screen 718 is provided with an approval icon 718a that approves the input content of the session member, and these processing ends if the approval icon 718a is clicked.

The list of session member thus input is received by the session member input section 702 and transferred to the session start request section 701.

Next, when the user does the operation that demands the session beginning, the session start request section 701 accepts the operation, generates a session demand signal S3_1 to which the above-mentioned list of the session member is appended, and transmits the session demand signal S3_1 to the PoC server 900. The session start request section 701 corresponds to an example of the start request section referred to in the present invention.

The session start section 901 of the PoC server 900 receives the session demand signal S3_1. First of all, the session start section 901 transfers the list of the session member appended to the session demand signal S3_1 to the session member storage section 910. And, the session start section 901 constructs a telecommunication system to which two or more cellular phones 700 belong in establishing a telecommunication line between two or more cellular phones 700 respectively corresponding to the list of the session member. The session start section 901 corresponds to an example of the transfer start section referred to in the present invention.

Also in the present embodiment, in a similar fashion to that of the first and second embodiments, there is disclosed, as a method beginning of the session, a method in which a line is established directly from the PoC server for the individual cellular phone. However, the present invention is not restricted to the present embodiment. The method of beginning the session may be a method in which the PoC server directs each cellular phone the connection for instance first without the IP network, and the line is established from each cellular phone side for the PoC server.

The communication system 3 of FIG. 14 is the one in which the list of the session members corresponding to the four cellular phones 700 is input in either of cellular phone 700 of four cellular phones 700, and is constructed as a result. The session start section 901 transmits to each cellular phone 700 a session beginning signal S3_2 that indicates the effect that the session by the user of these cellular phones 700 is begun. Here, session member's name is indicated in the session beginning signal S3_2 as well as the first embodiment as for the present embodiment. In addition, it is indicated so about the user of cellular phone 700 that doesn't connect the line by busy.

The session start receiving section 703 of each cellular phone 700 receives the session beginning signal S3_2 and transfers the same to the session start informing section 704. The session start informing section 704 displays the session screen associated with the usual broadcast communication on the liquid crystal panel 101 shown in FIG. 2 in accordance with the session beginning signal S3_2.

According to the present embodiment, after the session starts, a user, who wishes the speech in the usual broadcast communication, depresses the speaker switch 100D. On the other hand, a user, who wishes the speech in the restrictive broadcast communication, inputs a receiver and a concealment user where the user becomes a speaker in the restrictive broadcast communication through the following input screens, before depression of the speaker switch 100D.

Figure 18:
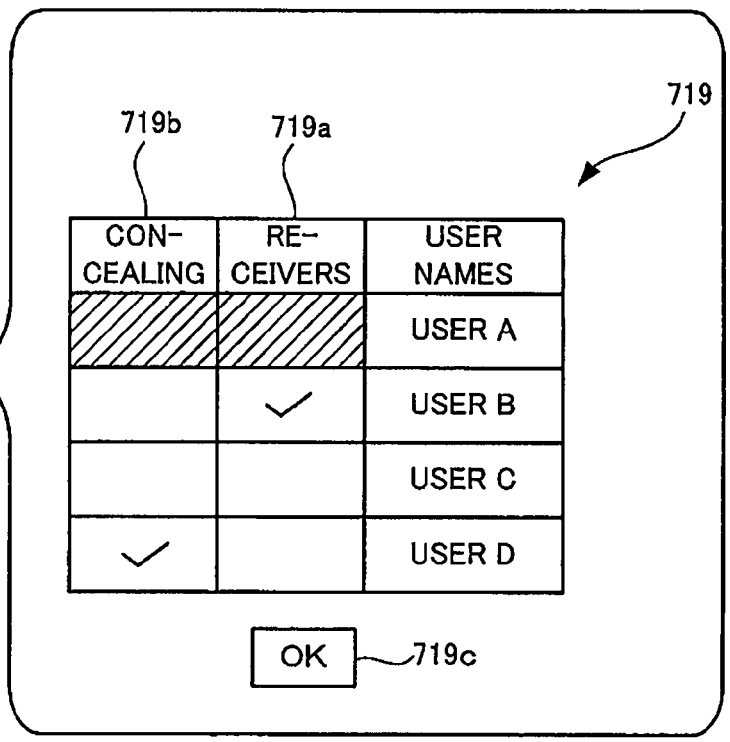
FIG. 18 is a view showing an example of an input screen for the receiving users and the concealing users.

FIG. 18 is a view showing an example of an input screen for receivers or the receiving users and the concealing users.

An input screen 719 for receivers and concealing users, which is shown in FIG. 18, is displayed by the receiver input section 706 when a user instructs an input for receivers and concealing users via a predetermined menu.

The input screen 719 for receivers and concealing users has a receiver input column 191a and a concealing user input column 719b. According to the embodiment shown in FIG. 18, it is a screen which is displayed on the cellular phone 700 of user A. The places associated with one's own cellular phone in two input columns are painted out with the gray so as to inhibit from being input.

In the receiver input column 719a, when a user clicks the column associated with a user who is desired to be a receiver, a check mark is marked so that the user is designated as the receiver. Likely, in the concealing user input column 719*b*, when a user clicks the column associated with a user who is desired to be a concealing user, a check mark is marked so that the user is designated as the concealing user. According to the embodiment shown in FIG. 18, the user B is specified for a receiver when the user A becomes a speaker, and user D is specified for the concealing user.

The input screen 719 for receivers and concealing users has further an approval icon 719*c* that approves the content of the input. Processing ends when the approval icon 719*c* is clicked.

The receiver thus input via the input screen 719 is received by the receiver input section 706, and the concealing user is received by the concealment user input section 708. The receiver input section 706 creates receiver information S3_3 indicative of a telephone number of the receiver of cellular phone 700 of the receiver received, or a list of the telephone numbers if the receivers received are plurals, and transfers the receiver information S3_3 to the receiver information transmission section 705. The concealment user input section 708 creates concealing user information S3_4 indicative of a telephone number of the cellular phone 700 of the concealing user received, or a list of the telephone numbers, and transfers the concealing user information S3_4 to the concealing user information transmission section 707. The receiver input section 706 corresponds to an example of the transfer terminal input section referred to in the present invention. The concealment user input section 708 corresponds to an example of the concealment terminal input section referred to in the present invention.

When the user who hopes for the speech pushes the speaker switch 100D of one's own cellular phone 700, the speaker right demand section 709 of the cellular phone 700 transmits a speaker right demand signal S3_5 that demands the speaker right to the PoC server 900. Here, the telephone number of the cellular phone 700 that transmits the speaker right demand signal S3_5 is appended to the speaker right demand signal S3_5.

When this user hopes for the restrictive broadcast communication, and inputs the receiver and the concealing user as stated above, the speaker right demand section 709 notifies the receiver information transmission section 705 and the concealment user information transmitting section 707 the transmission timing of speaker right demand signal S3_5. Both the receiver information transmission section 705 and the concealment user information transmitting section 707 transmit the receiver information S3_3 and the concealing user information S3_4 to the PoC server 900 respectively in synchronism with the timing. The receiver information transmission section 705 corresponds to an example of the transfer terminal notification section referred to in the present invention. The concealment user information transmitting section 707 corresponds to an example of the concealment terminal notification section referred to in the present invention.

The receiver information receiving section 902, the concealment user information receiving section 903, and the speaker right giving section 904 of the PoC server 900 receive the receiver information S3_3, the concealing user information S3_4, and the speaker right demand signal S3_5, respectively.

The receiver information receiving section 902 notifies the speaker information transmitting section 905, the non-receiver grasp section 906, and the audio data transfer section 909 of the receiver indicated by the receiver information S3_3 transmitted most ahead. The receiver information receiving section 902 corresponds to an example of one as the transfer destination setting section, the transfer restriction section, and the notification setting section referred to in the present invention.

The concealment user information receiving section 903 notifies the non-receiving information transmitting section 907 of the concealing user indicated by the concealing user information S3_4 transmitted most ahead.

The speaker right giving section 904 makes a user indicated by the speaker right demand signal S3_5 transmitted most ahead, as a speaker, decides giving the speaker right to the cellular phone 700 of the user, and notifies the speaker information transmission section 905 and the non-receiver grasp section 906 of the speaker.

The speaker information transmission section 905 recognizes the present communication method as the restrictive broadcast communication when the speaker and the receiver are notified, and recognizes the present communication method as the usual broadcast communication when only the speaker is notified. In the event that the present communication method is the restrictive broadcast communication, the speaker information transmission section 905 creates speaker information S3_6 wherein the restrictive broadcast communication is described in the method column, the name of the notified speaker is described in the speaker column, and the name of the notified receiver is described in the receiver column. On the other hand, in the event that the present communication method is the usual broadcast communication, the speaker information transmission section 905 creates speaker information S3_6 wherein the usual broadcast communication is described in the method column, the name of the notified speaker is described in the speaker column, and the receiver column is an empty column. Thus created speaker information S3_6 is transmitted to individual cellular phones 700. The speaker information transmission section 905 corresponds to an example of one serving both as the originating terminal transmission section and the busy information transmission section referred to in the present invention.

When the non-receiver grasp section 906 is notified of the speaker and the receiver, the non-receiver grasp section 906 recognizes users except the speaker and the receiver among the session members stored in the session member storage section 910 as non-receiver wherein the audio data is not transmitted to the cellular phone 700. The non-receiving information transmitting section 907 is notified of the recognized receiver. Moreover, when the present communication method is the usual broadcast communication and only the speaker is notified, the non-receiver grasp section 906 becomes a stand-by state.

The non-receiving information transmitting section 907 creates non-receiving information S3_7 indicating that no audio data is transferred to the cellular phone 700 of the non-receiver, and transmits the non-receiving information S3_7 to the cellular phone 700 of the non-receiver. Moreover, when the present communication method is the usual broadcast communication and the non-receiver is not notified, the non-receiving information transmitting section 907 becomes a stand-by state. The non-receiving information transmitting section 907 corresponds to an example of the specification information transmission section referred to in the present invention.

The speaker information receiving section 710 of individual cellular phone 700 receives the speaker information S3_6. The speaker information receiving section 710 confirms whether the speaker information S3_6 includes the telephone number of one's own cellular phone. When the speaker information receiving section 710 confirms that the speaker information S3_6 includes the telephone number of one's own cellular phone, the speaker information receiving section 710 judges that the one's own cellular phone is the cellular phone 700 of the speaker, notifies the speaker display section 711 so, and permits the audio input section 714 to accept the voice.

The non-receiving information receiving section 712 of individual cellular phone 700 of non-receiver receives the non-receiving information S3_7. Upon receipt of the non-receiving information S3_7, the non-receiving information receiving section 712 recognizes that the one's own cellular phone is the cellular phone 700 of the non-receiver, and informs the speaker display part 711 and the audio reproducing section 716 of the effect.

The speaker display section 711 notifies the user of the acquisition situation of the speaker right by using the above-mentioned session screen according to the content of the notification from the speaker information receiving section 710 and the non-receiving information receiving section 712. In the event that the present session is concerned with the usual broadcast communication, the session screen displayed at that time omits the column for the receiver, as mentioned in the first embodiment, and thus the user is notified of only the name of the speaker. On the other hand, in the event that the present session is concerned with the restrictive broadcast communication, the content of the notification is different in accordance with the speaker, the receiver, non-receiver, and the concealment user in the user of the cellular phone 700. The speaker display section 711 shows the speaker, the receiver, and non-receiver who the speaker and the receiver are, and hides it secretly to the concealment user. The speaker display section 711 corresponds to an example of one serving both as the busy notification section and the non-transfer notification section referred to in the present invention.

Figure 19:
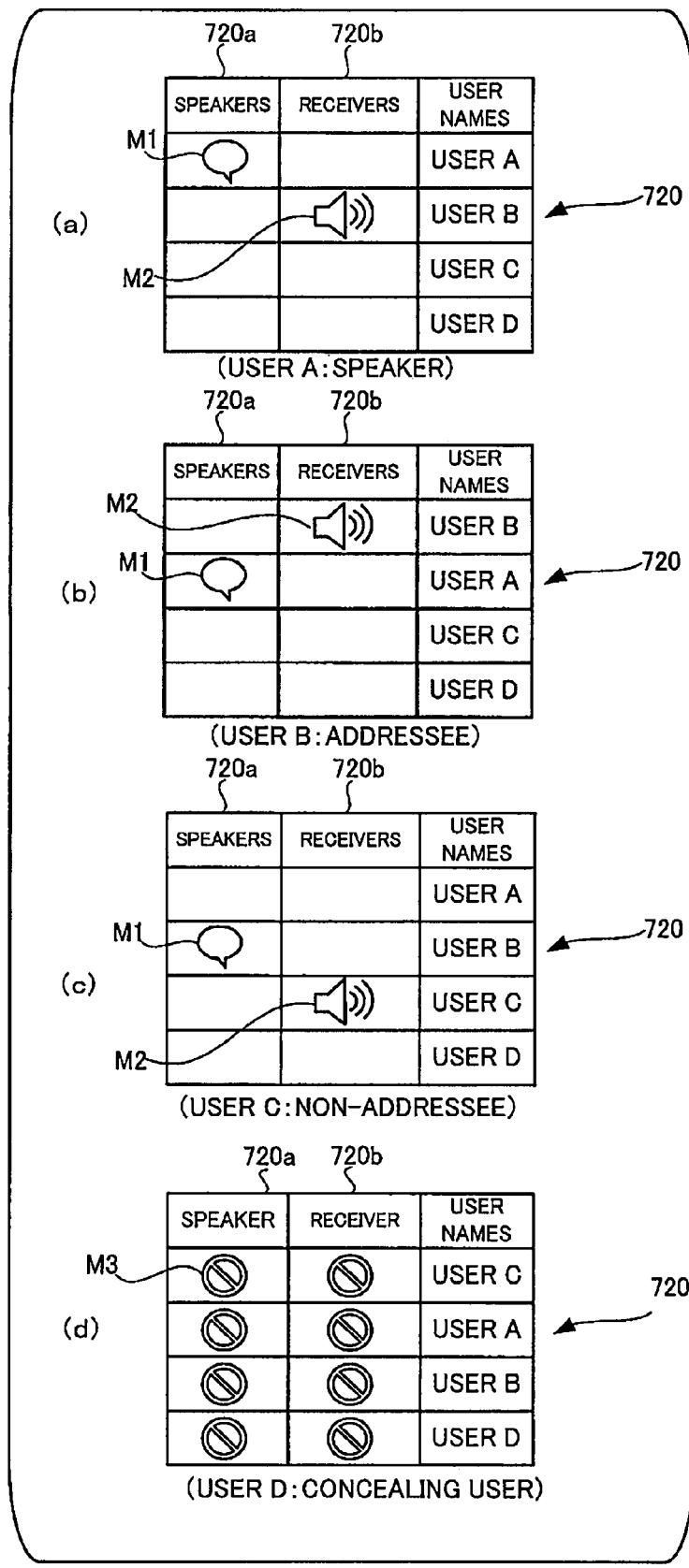
FIG. 19 is an explanatory view useful for understanding states of acquisition of speaker right on the session screen on the restrictive broadcast communication.

FIG. 19 is an explanatory view useful for understanding states of acquisition of speaker right on the session screen on the restrictive broadcast communication.

A part (a) of FIG. 19 shows a session screen 720 for the speaker. A part (b) of FIG. 19 shows a session screen 720 for the receiver. A part (c) of FIG. 19 shows a session screen 720 for the non-receiver. A part (d) of FIG. 19 shows a session screen 720 for the concealment user.

In the session screen 720 for the speaker, a speaker mark M1 that means the speaker is filled in on the column of the highest stage corresponding to the name of the speaker in a speaker column 720a, and a receiver mark M2 that means the receiver is filled in on the column corresponding to the present receiver in a receiver column 720b. Moreover, in the session screen 720 for the speaker, the receiver mark M2 is filled in on the corresponding column of the plural in the event that two or more receivers exist.

In the session screen 720 for the receiver, the receiver mark M2 is filled in on the column of the highest stage corresponding to the name of the receiver in the receiver column 720b, and the speaker mark M1 is filled in on the column corresponding to the present speaker in the speaker column 720a.

In the session screen 720 for the non-receiver, the speaker mark M1 is filled in on the column corresponding to the present speaker in the speaker column 720a, and the receiver mark M2 is filled in on the column corresponding to the present receiver in the receiver column 720b.

In the session screen 720 for the concealment user, a concealment mark M3, which indicates that the speaker right is now acquired in either of the cellular phone 100 with hiding the speaker and the receiver secretly, is filled in on all columns.

When the speaker right is acquired like this and each user is notified of the effect, the audio input section 714 of the cellular phone 700 to acquire the speaker right creates audio data S3_8 indicative of the voice input at that time and transfers the audio data to the audio data transmitting section 713. The audio data transmitting section 713 transmits the audio data S3_8 to the PoC server 900.

The audio data receiving section 908 of the PoC server 900 receives the audio data S3_8 transmitted from the cellular phone 700 of the speaker and transfers the same to the audio data transfer section 909. The audio data transfer section 909 transfers the audio data S3_8 to the cellular phone 700 of the receiver notified from the receiver information receiving section 902.

The audio data receiving section 715 of the cellular phone 700 of the receiver receives the audio data S3_8 and transfers the same to the audio reproducing section 716. The audio reproducing section 716 reproduces the voice represented by the audio data S3_8. On the other hand, when the audio reproducing section 716 is notified from the non-receiving information receiving section 712 of the effect that the one's own cellular phone is the cellular phone 700 of the non-receiver or the concealment user, the audio reproducing section 716 reads from the non-receiving audio data storage section 717 non-receiving audio data representative of an alternative voice at the time of non-receiving, and reproduces the alternative voice represented by the non-receiving audio data. The audio reproducing section 716 continues the reproduction of the alternative voice until one's own cellular phone acquires the speaker right or it is notified of the effect that one's own cellular phone is the cellular phone 700 of the receiver. The audio reproducing section 716 corresponds to an example of one serving both as the audio reproducing section and the alternative audio reproducing section referred to in the present invention.

According to the present embodiment, there is disclosed an example in which the reproduction of the alternative voice is stopped when one's own cellular phone acquires the speaker right or it is notified of the effect that one's own cellular phone is the cellular phone 700 of the receiver. However, the present invention is not restricted to the embodiment, and it is acceptable that the reproduction of the alternative voice is stopped when the speaker right is restored from the cellular phone of the speaker to the PoC server.

When the speaker finishes making remarks and the speaker switch is released, the speaker right demand section 709 of the speaker's cellular phone 700 transmits a speaker right restoration signal S3_9 that indicates the effect to restore the speaker right to the PoC server 900. The speaker right giving section 904 receives the speaker right restoration signal S3_9. Thus, the speaker right giving section 904 accepts the restoration of the speaker right indicated by the speaker right restoration signal S3_9, and notifies the speaker information transmitting section 905 so. The speaker information transmitting section 905 transmits to all cellular phones 700 a restoration notification signal S3_10 that notifies the effect that the speaker right is restored now. In individual cellular phones 700, the speaker information receiving section 710 receives the restoration notification signal S3_10 and transfers the same to the speaker display section 711. Upon receipt of the restoration notification signal S3_10, the speaker display section 711 informs the users of the effect that the speaker right is being restored to the users now by making the speaker column and the receiver column on the session screen an empty column. As a result, the communication system 3 returns to the state before the acquisition of the speaker right.

Also in the communication system 3 according to the third embodiment, in a similar fashion that of the first embodiment, it is possible to simply communicate with the specified cellular phones 700 only in the broadcast session. Further according to the present invention, when the user who hopes for the restrictive broadcast communication demands the speaker right after specifying the receiver, so that the demand is accepted, the communication method becomes the restrictive broadcast communication. Moreover, when the user who hopes for the usual broadcast communication doesn't specify the receiver and the like this time in the state, and demands the speaker right, so that the demand is accepted, the communication method becomes the usual broadcast communication. Thus, in the communication system 3 according to the third embodiment, the communication method can be freely switched in accordance with whether to specify the receiver etc. In addition, in the communication system 3, because the receiver is arbitrarily specified, it is possible to more flexibly perform setting of the other party of the communication in the restrictive broadcast communication. Moreover, in the communication system 3, it is possible to specify a desired concealing user when the speaker right is demanded.

Next, there will be explained a fourth embodiment of the present invention.

Figure 20:
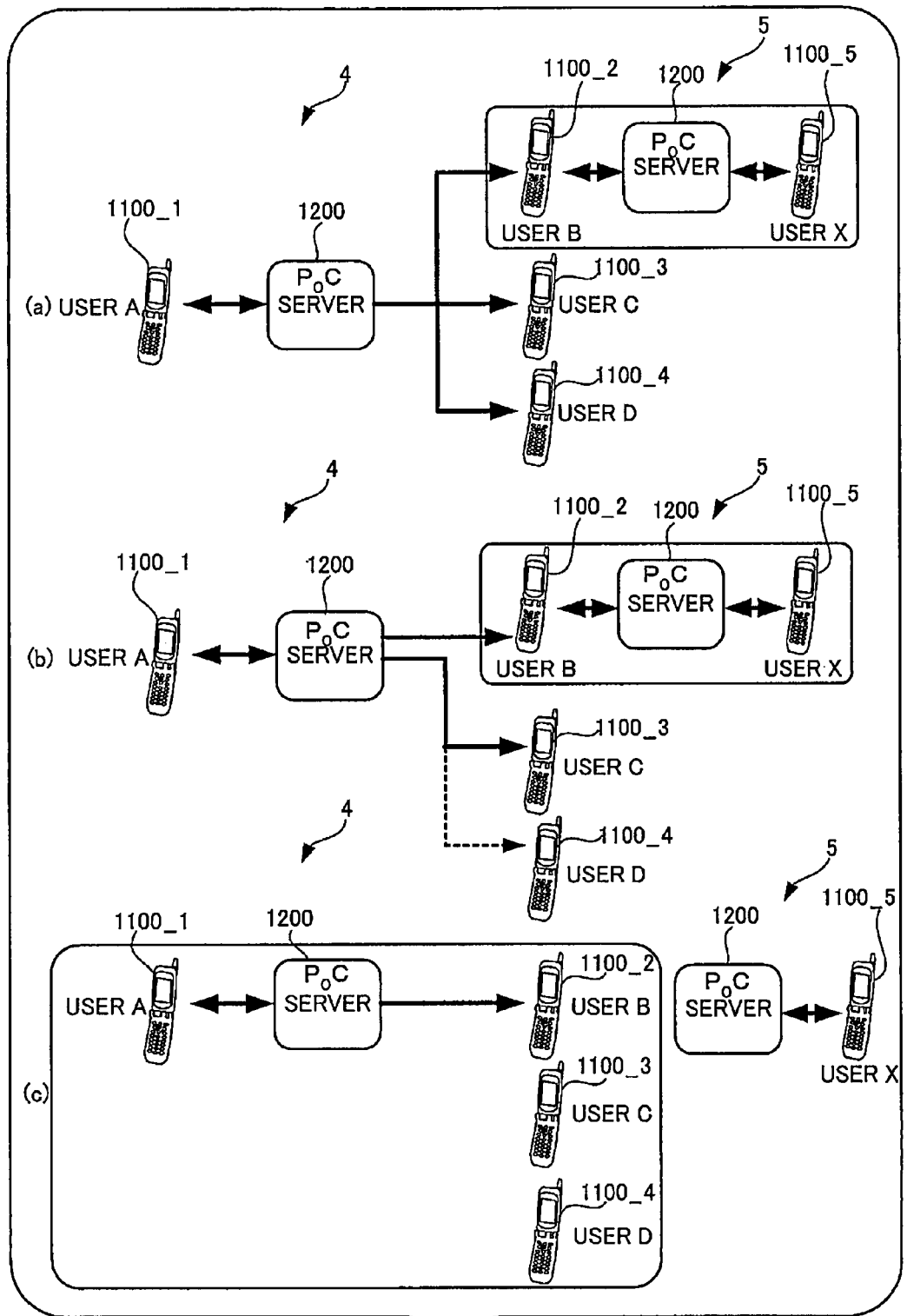
FIG. 20 is a typical illustration of a communication system according to a fourth embodiment of the present invention.

FIG. 20 is a typical illustration of a communication system according to the fourth embodiment of the present invention.

A communication system shown in FIG. 20 is one which is modified in the above-mentioned third embodiment. There will be explained it paying attention to the difference point with the third embodiment in the following.

FIG. 20 shows a first communication system 4 that comprises four cellular phones 1100_1, 1100_2, 1100_3, 1100_4 and 1 PoC server 1200. FIG. 20 further shows a second communication system 5 that is different from the first communication system 4. The second communication system 5 comprises the PoC server 1200 that composes the first communication system 4, the cellular phone 1100_2 of user B, and a cellular phone 1100_5 of user X who doesn't belong to the first communication system 4. In FIG. 20, showing is omitted about the base station shown in FIG. 1 and FIG. 10 for the simplification of figure.

Moreover, in order to easily understand the invention, FIG. 20 shows PoC server 1200 on each of the first communication system 4 and the second communication system 5. However, according to the present embodiment, these two communication systems are physically managed with one PoC server 1200. The present invention is not restricted to the present embodiment. It is acceptable that there exist two PoC servers for managing two communication systems, respectively, which are physically different from one another.

According to the first communication system 4 of the present embodiment, in a similar fashion to that of the third embodiment, it is possible to designate the receiver through the cellular phone of the speaker. In the event that the cellular phone of the designated receiver belongs to another system as in the second communication system 5, it is possible to switch the system to which one's own cellular phone belongs to a desired system through the cellular phone of the receiver. This feature makes it possible that a speaker calls the session in which he is participating for the user who is participating in other sessions.

A part (a) of FIG. 20 shows a state that the first communication system 4 that assumes four cellular phones including cellular phone 1100_2 of user B who belongs to the second communication system 5 to be a component is constructed with PoC server 1200.

Under such a condition, the effect about which user B is talking now is displayed on the session screen displayed by each cellular phone that belongs to the first communication system 4 as mentioned above.

A part (b) of FIG. 20 shows a state that a session by the restrictive broadcast communication begins in the first communication system 4, so that the cellular phone 1100_1 of the user A acquires the speaker right in the session and the user B is designated as the receiver. As for the part (b), there is shown an example in which the user C and the user D are designated as a non-receiver and a concealment user, respectively. In this example, it is shown in the solid line and the broken line, respectively that the user C is notified of the effect the user A is a speaker and the user B is a receiver, and such effect is concealed for the user D. Moreover, at that time, as will be described later, the user B is notified of the effect with the call from another session.

A part (c) of FIG. 20 shows a state that the user B switches the system to which one's own cellular phone 1100_2 belongs from the second communication system 5 to the first communication system 4. As a result, the session in the second communication system 5 is interrupted, and the user B participates in the session in the first communication system 4.

According to the present embodiment, in the event that the session by the usual broadcast communication starts in the first communication system 4, the call to the user B is not done, and user B participates in the session by the usual broadcast communication in the first communication system 4 when another session ends.

Hereinafter, there will be explained the present embodiment, paying attention to the switch function of the system at the session by the restrictive broadcast communication. In the following, five cellular phones shown in FIG. 20 are shown with one cellular phone 1100.

Figure 21:
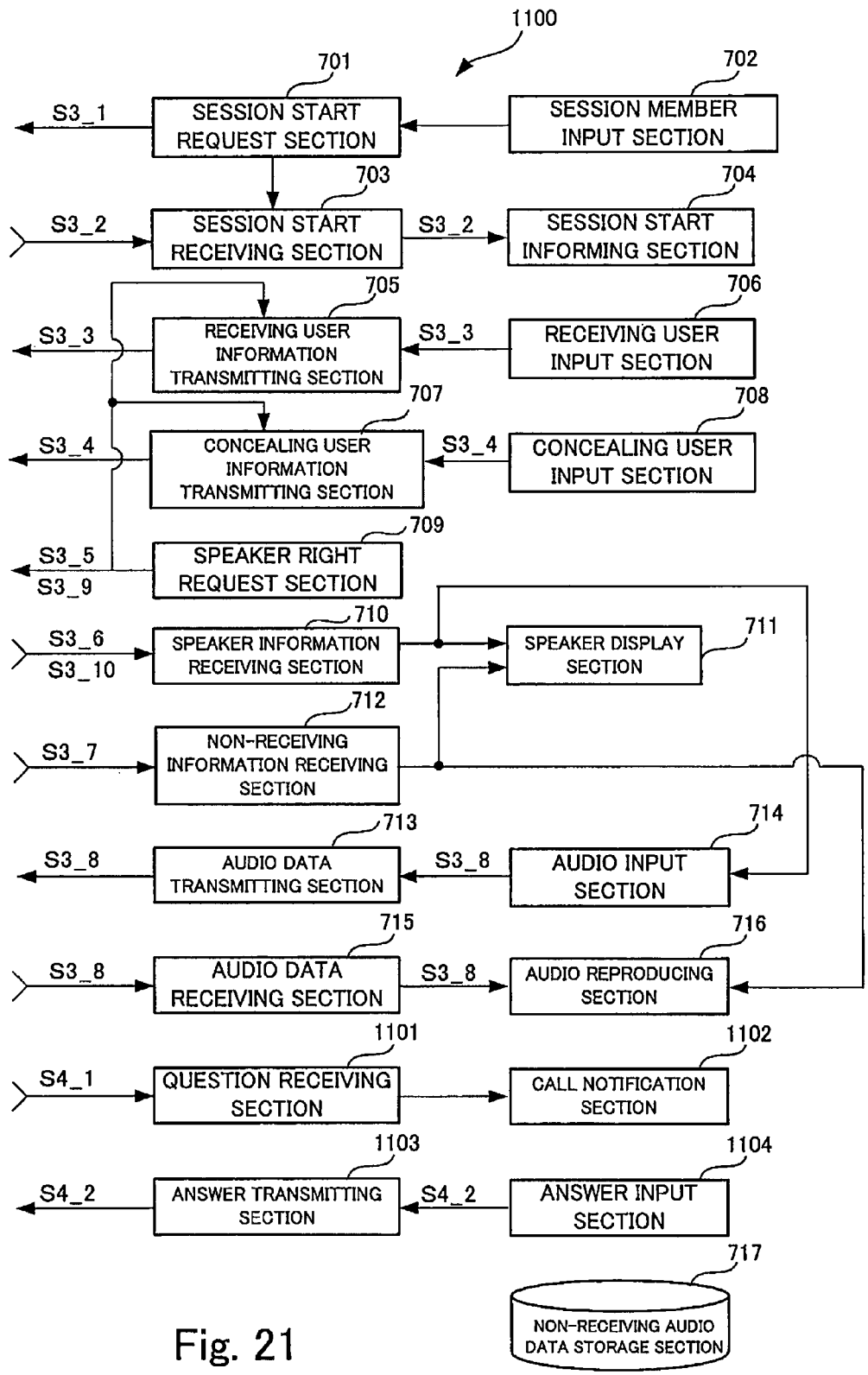
FIG. 21 is a functional block diagram useful for understanding a broadcast communication function of the cellular phone 1100 shown in FIG. 20.
Figure 22:
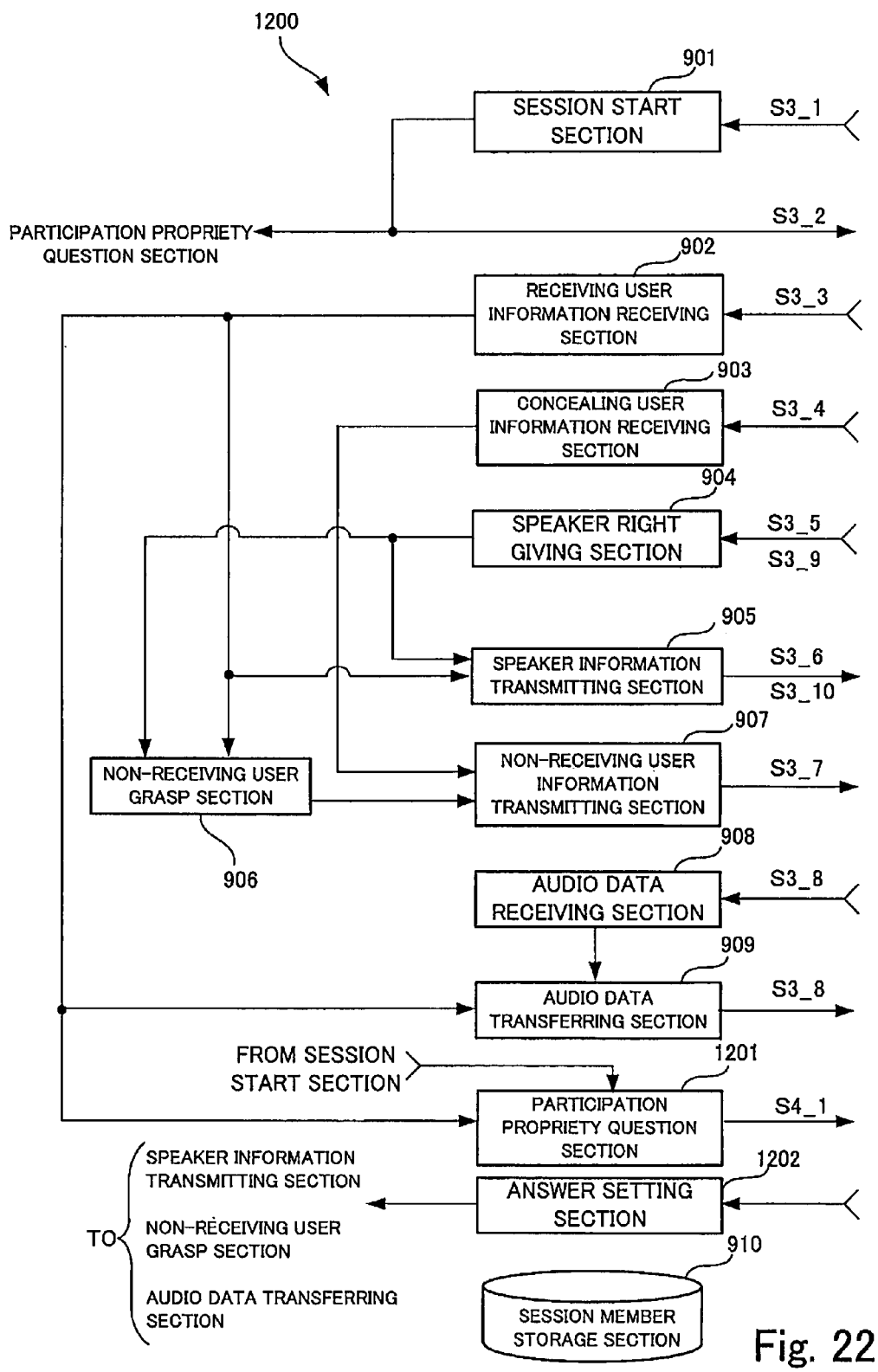
FIG. 22 is a functional block diagram useful for understanding a broadcast communication function of the PoC server 1200 shown in FIG. 20.

FIG. 21 is a functional block diagram useful for understanding a broadcast communication function of the cellular phone 1100 shown in FIG. 20. FIG. 22 is a functional block diagram useful for understanding a broadcast communication function of the PoC server 1200 shown in FIG. 20.

In FIG. 21, the same parts are denoted by the reference numbers as those of FIG. 15 which shows the cellular phone 700 in the third embodiment. In FIG. 22, the same parts are denoted by the reference numbers as those of FIG. 16 which shows the PoC server 900 in the third embodiment. As to those structural elements, redundant explanation will be omitted.

In the cellular phone 1100 of FIG. 21, the components serving as the switch function of the system are a question reception section 1101, a call notification section 1102, an answer transmission section 1103, and an answer input section 1104. In the PoC server 1200 of FIG. 22, the components serving as the function of the PoC server 1200 are a participation propriety question section 1201 and an answer setting section 1202. Here, the participation propriety question section 1201 and the answer setting section 1202 of the PoC server 1200 correspond to the participation propriety question section and the answer setting section referred to in the present invention, respectively.

First of all, in the event that there is user's one participating in another session or belonging to another system in the cellular phone 1100 when the first communication system 4 of FIG. 20 is constructed in the session start section 901 of the PoC server 1200, the participation propriety question section 1201 is notified so.

Next, assuming that the user participating in another session is designated as the receiver in the first communication system 4, the input screen for the receiver and the concealment user at the designation side is as follows.

Figure 23:
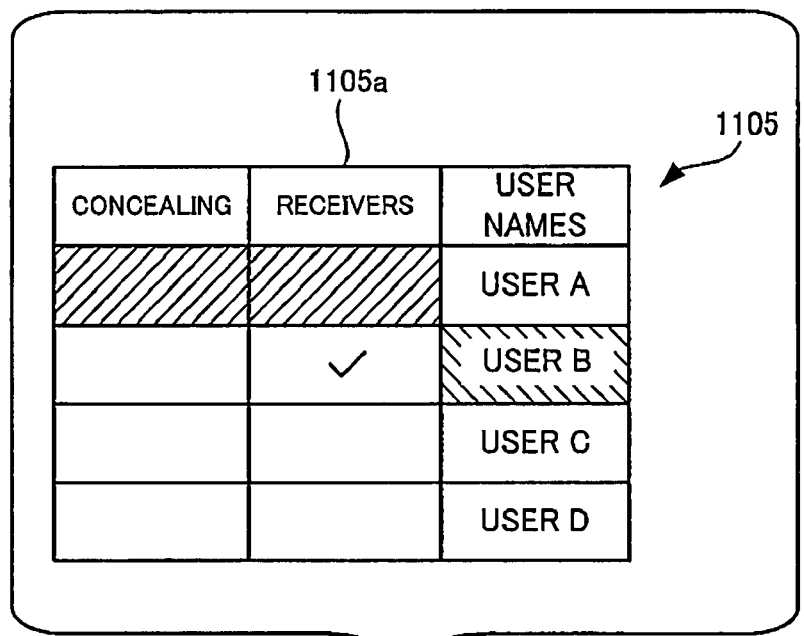
FIG. 23 is a view showing an example of an input screen for the receiving users and the concealing users in the designation side, where a user, who participates in another session, is designated as the receiving user.

FIG. 23 is a view showing an example of an input screen for the receiving users and the concealing users in the designation side, where a user, who participates in another session, is designated as the receiving user or the receiver.

FIG. 23 shows an input screen 1105 for the receiver and the concealment user at the designation side. The effect that the user B is participating in another session now and it is busy is indicated by the column of user B being painted out with the gray on the input screen 1105. According to the present embodiment, it is possible to designate the user now on busy too as the receiver by clicking a pertinent column in the receiver column 1105a. According to the example of FIG. 23, the check mark is filled in on the column that corresponds to the user B now on busy, in the receiver column 1105a.

The receiver is notified to the participation propriety question section 1201 by the receiver information receiving section 902. When the receiver notified by the receiver information receiving section 902 is corresponding to the receiver on busy notified from the session start section 901, the participation propriety question section 1201 transmits a question signal S4_1 that asks right or wrong of participation in the first communication system 4 to the receiver's cellular phone 1100.

The question reception section 1101 of the receiver's cellular phone 1100 receives the question signal S4_1, and notifies the call notification section 1102 of the effect of receipt of the question signal S4_1. Upon receipt of the notification, the call notification section 1102 notifies the user of the effect of a call from another session as follows.

Figure 24:
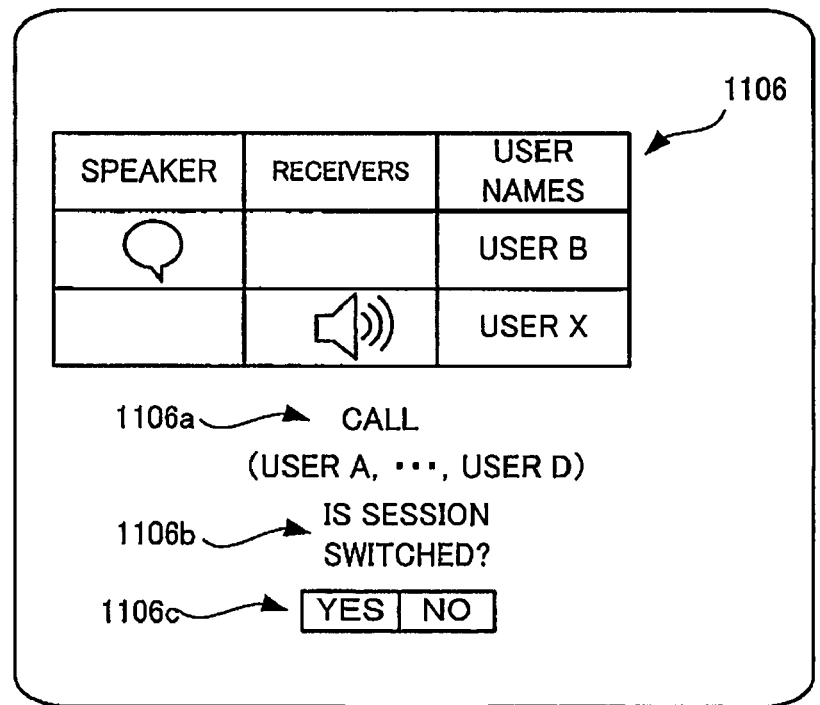
FIG. 24 is an explanatory view useful for understanding a state notifying that a user is called from another session.

FIG. 24 is an explanatory view useful for understanding a state notifying the effect that a user is called from another session.

FIG. 24 shows a session screen 1106 in the cellular phone 1100 of the user B participating in the session in the second communication system 5 of FIG. 20. On the session screen 1106, there is indicated the effect that the user B is a speaker now and the user X who is participating in the same session is a receiver. At that time, when there is a call from another session for the user B, a message 1106a so is displayed with the name of the member of another session. In addition, a message 1106b to ask whether to switch the participation session from a present session to the session with the call is displayed, and a switch input section 1106c to input right or wrong of the switch is displayed under the message 1106b.

When the user clicks the button corresponding to either of right or wrong in the switch input section 1106c, the content of the input is received in the answer input section 1104 in the cellular phone 1100 of FIG. 21. In the answer input section 1104, switch propriety information S4_2 that reflects the content of the input is made, and it is transferred to the answer transmission section 1103. The answer transmission section 1103 transmits the switch propriety information S4_2 to the PoC server 1200.

The switch propriety information S4_2 is received in the answer setting section 1202 of the PoC server 1200. The answer setting section 1202 judges whether the switch propriety information S4_2 indicates that the switch is acceptable. When it is decided that the switch propriety information S4_2 indicates that the switch is acceptable, the answer setting section 1202 notifies the speaker information transmission section 905, the non-receiver grasp section 906, and the audio data transfer section 909 so.

The speaker information transmission section 905 and the non-receiver grasp section 906 performs processing corresponding to the new receiver respectively, and the processing result is notified each cellular phone 1100 of the first communication system 4, and displayed on the session screen of each cellular phone 1100. On the other hand, on the session screen of cellular phone 1100 that belongs to the second communication system 5, there is displayed the effect the user who has moved to the session in the first communication system 4 is now on busy.

Figure 25:
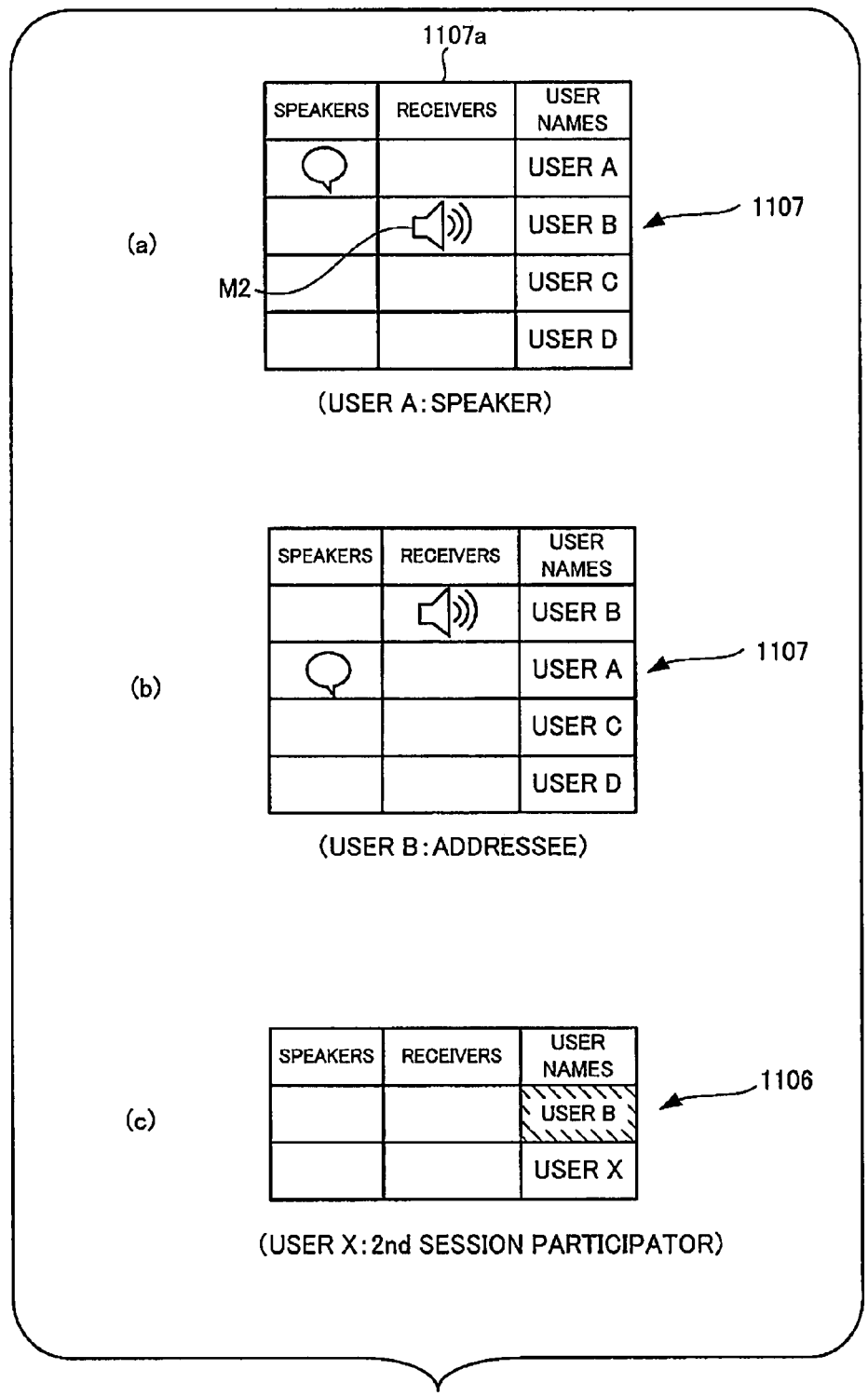
FIG. 25 is a view showing an example of a session screen of individual cellular phone 1100 after the session changeover.

FIG. 25 is a view showing an example of a session screen of individual cellular phone 1100 after the session changeover.

A part (a) of FIG. 25 shows a session screen 1107 in the cellular phone 1100 of the speaker who specified the user who is participating in another session for the receiver. As shown in the part (a), in the event that the specified user accepts the specification, painting out the gray shown while talking on the session screen 1107 disappears and the receiver mark M2 is filled in on a pertinent column in the receiver column 1107a.

A part (b) of FIG. 25 shows a session screen 1107 in the cellular phone 1100 of the user who switched from the session in the second communication system 5 to the session in the first communication system 4. According to the present embodiment, when a button corresponding to the acceptance of the switch is clicked in the switch input section 1106c shown in FIG. 24, the session screen changes into the one of a switch session of interest. In part (b) of FIG. 25, there is shown the state that changes from the session screen 1106 of the session in the second communication system 5 into the session screen 1107 of the session in the first communication system 4.

A part (c) of FIG. 25 shows the state that the column of the user who has moved to the session in the first communication system 4 is painted out with the gray on the session screen 1106 of other cellular phones 1100 that belong to the second communication system 5. As a result, the user who is participating in the session in the second communication system 5 learns that one of the session members came off the session.

According to the fourth embodiment as mentioned above, when the receiver is specified, it is possible to designate also the user who is participating in another session as the receiver. Thus, it is possible to limit more flexibly the other party of the communication.

According to the above mentioned embodiments of the communication system of the present invention, there is disclosed a system for performing a session by the cellular phone. However, the present invention is not restricted to the present embodiments, and it is acceptable that the communication system of the present invention is a system for performing a session by IP telephone for instance.

According to the above mentioned embodiments of the present invention, as an example of the association data transmitting section referred to in the present invention, there is disclosed the non-receiving association data transmitting section 604 which transmits the association data indicative of the association between the speaker and the non-receiver to each cellular phone, so that the association between the speaker and the receiver is indirectly transmitted to each cellular phone. However, the present invention is not restricted to the embodiments, and it is acceptable that the association data transmitting section referred to in the present invention directly transmits the association between the speaker and the receiver for instance.

According to the above mentioned embodiments of the communication system of the present invention, there is disclosed an example in which the cellular phone that belongs to the communication system is identified by the telephone number of each cellular phone. However, the present invention is not restricted to the embodiments, and it is acceptable that the communication system of the present invention is one in which the cellular phone that belongs to the communication system is identified by the name of the owner of each cellular phone.

As mentioned above, according to the present invention, it is possible to provide a communication system that performs a broadcast data communication between two or more terminal equipments, which is capable of communicating with only some terminal equipments in a simple way, server equipment that is used in such a communication system, and terminal equipment that is used in such server equipment.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A communication system that includes one or more terminal equipments and a server equipment, transmits audio data representing a voice from one of the terminal equipments, transfers the audio data to other terminal equipments at the server equipment and reproduces the voice in real-time at the other terminal equipments, the server equipment comprising:
an audio data receiving section that receives the audio data transmitted from the terminal equipment;
an audio data transfer section that transfers the audio data received by the audio data receiving section to each of the other terminal equipments excepting an originating terminal equipment that originates the audio data;
a transfer destination setting section that associates a transfer terminal equipment, to which the audio data is to be transferred by the audio data transfer section, with the terminal equipment that becomes the originating terminal equipment, when the terminal equipment becomes the originating terminal equipment; and
a transfer restriction section that restrictively transfers the audio data to the transfer terminal equipment when the audio data transfer section transfers the audio data, each of the terminal equipments comprising:
an audio data transmitting section that transmits the audio data;
a transferred audio data receiving section that receives the audio data transferred from the server equipment; and
an audio reproducing section that reproduces in real-time the voice represented by the audio data received by the transferred audio data receiving section.

2. A communication system according to claim 1, wherein the transfer destination setting section indirectly sets the transfer terminal equipment by setting a non-transfer terminal equipment to which transfer of the audio data is prohibited.

3. A communication system according to claim 1, wherein the transfer destination setting section associates the transfer terminal equipment with individual terminal equipment.

4. A communication system according to claim 1, wherein the terminal equipment comprises:
an association data creating section that creates association data representative of an association between the transfer terminal equipment and individual terminal equipment in accordance with an operation; and
an association data transmitting section that transmits the association data created by the association data creating section, and wherein the server equipment comprises:
an association data receiving section that receives the association data and sets the transfer terminal equipment to the transfer destination setting section in accordance with the association represented by the association data.

5. A communication system according to claim 1, wherein the terminal equipment comprises:
a transfer terminal input section that inputs the transfer terminal equipment through an input operation where one's own terminal equipment becomes the originating terminal equipment; and
a transfer terminal notification section that notifies the server equipment of the transfer terminal equipment input by the transfer terminal input section, and wherein the server equipment comprises:
a notification setting section that sets the transfer terminal equipment to the transfer destination setting section associating with the terminal equipment that notifies of the transfer terminal equipment upon receipt of notification of the transfer terminal equipment from the terminal equipment.

6. A communication system according to claim 1, wherein the server equipment comprises:
a busy information transmitting section that transmits busy information indicative of the effect that other terminal equipment is the originating terminal equipment to other terminal equipments excepting the originating terminal equipment, of two or more terminal equipments, and wherein the terminal equipment comprises:
a busy notification section that notifies a user of one's own terminal equipment of the effect that other terminal equipment is the originating terminal equipment upon receipt of the busy information.

7. A communication system according to claim 1, wherein the server equipment comprises:
a busy information transmitting section that transmits busy information indicative of the effect that other terminal equipment is the originating terminal equipment to other terminal equipments excepting the originating terminal equipment, of two or more terminal equipments, and wherein the terminal equipment comprises:
a busy notification section that notifies with an image a user of one's own terminal equipment of the effect that other terminal equipment is the originating terminal equipment upon receipt of the busy information.

8. A communication system according to claim 1, wherein the server equipment comprises:
a busy information transmitting section that transmits busy information indicative of the effect that other terminal equipment is the originating terminal equipment on a basis that what terminal equipment is the originating terminal equipment, to other terminal equipments excepting the originating terminal equipment, of two or more terminal equipments, and wherein the terminal equipment comprises:
a busy notification section that notifies a user of one's own terminal equipment of the effect that other terminal equipment is the originating terminal equipment upon receipt of the busy information.

9. A communication system according to claim 1, wherein the server equipment comprises:
a busy information transmitting section that transmits busy information indicative of the effect that other terminal equipment is the originating terminal equipment on a basis that what terminal equipment is the originating terminal equipment, to other terminal equipments excepting the originating terminal equipment, of two or more terminal equipments, and wherein the terminal equipment comprises:

a busy notification section that notifies with an image unable to specify the originating terminal equipment a user of one's own terminal equipment of the effect that other terminal equipment is the originating terminal equipment upon receipt of the busy information.

10. A communication system according to claim 1, wherein the terminal equipment comprises:

a concealment terminal input section that inputs through an input operation a concealment terminal equipment from which it is to be concealed that one's own terminal equipment becomes the originating terminal equipment; and a concealment terminal notification section that notifies the server equipment of the concealment terminal equipment input by the concealment terminal input section, wherein the server equipment comprises:

a busy information transmitting section that transmits busy information indicative of the effect that other terminal equipment is the originating terminal equipment on a basis that what terminal equipment is the originating terminal equipment, to the concealment terminal equipment of two or more terminal equipments, and wherein the terminal equipment further comprises:

a busy notification section that notifies a user of one's own terminal equipment of the effect that other terminal equipment is the originating terminal equipment upon receipt of the busy information.

11. A communication system according to claim 1, wherein the server equipment comprises:

a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, and wherein the terminal equipment comprises:

a confirmation section that confirms a stop of transfer of the audio data from the originating terminal equipment to a user of one's own terminal equipment in accordance with the non-transfer confirmation information upon receipt of the non-transfer confirmation information; and a non-transfer notification section that notifies a user of one's own terminal equipment of the effect that one's own terminal equipment does not receive the audio data, when the confirmation section confirms a stop of transfer of the audio data.

12. A communication system according to claim 1, wherein the server equipment comprises:

a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, and wherein the terminal equipment comprises:

a confirmation section that confirms a stop of transfer of the audio data from the originating terminal equipment to a user of one's own terminal equipment in accordance with the non-transfer confirmation information upon receipt of the non-transfer confirmation information; and a non-transfer notification section that notifies with an image a user of one's own terminal equipment of the effect that one's own terminal equipment does not receive the audio data, when the confirmation section confirms a stop of transfer of the audio data.

13. A communication system according to claim 1, wherein the server equipment comprises:

a specifying information transmitting section that transmits non-transfer specifying information indicative of the effect that the audio data is not transferred, to other terminal equipments excepting both the originating terminal equipment and the transfer terminal equipment, of two or more terminal equipments, and wherein the terminal equipment comprises:

a non-transfer notification section that notifies a user of one's own terminal equipment of the effect that one's own terminal equipment does not receive the audio data, upon receipt of the non-transfer specifying information.

14. A communication system according to claim 1, wherein the server equipment comprises:

an originating terminal transmitting section that transmits originating terminal information indicative of the terminal equipment which is the originating terminal equipment, to other terminal equipments excepting the originating terminal equipment, of two or more terminal equipments, and wherein the terminal equipment comprises:

an association storage section that stores an association of the transfer terminal equipments with two or more terminal equipments respectively;

a decision section that decides whether one's own terminal equipment is one concerned with the stop of transfer of the audio data from the originating terminal equipment by referring to the association stored in the association storage section for the terminal equipment indicated by the originating terminal information, upon receipt of the originating terminal information; and a non-transfer notification section that notifies a user of one's own terminal equipment of the effect that one's own terminal equipment does not receive the audio data, when the decision section decides that one's own terminal equipment is one concerned with the stop of transfer of the audio data.

15. A communication system according to claim 1, wherein the terminal equipment comprises:

a start requesting section that designates two or more terminal equipments including one's own terminal equipment and demands beginning of the transmission of the audio data between two or more the terminal equipments from the server equipment, wherein the server equipment comprises:

a transfer start section that causes the audio data transfer section to begin the transmission of the audio data between two or more specified terminal equipments when beginning of the transfer is demanded by the terminal equipment;

an association data delivery section that delivers association data indicative of the association of the transfer terminal equipment with each the two or more terminal equipments to each two or more terminal equipments when transmission of the audio data by the audio data transfer section is begun; and an originating terminal transmitting section that transmits originating terminal information indicative of the terminal equipment which is the originating terminal equipment, to other terminal equipments excepting the originating terminal equipment, of two or more terminal equipments, and wherein the terminal equipment comprises:

an association storage section that receives the association data delivered from the server equipment and stores the association represented by the association data; a decision section that decides whether one's own terminal equipment is one concerned with the stop of transfer of the audio data from the originating terminal equipment by referring to the association stored in the association storage section for the terminal equipment indicated by the originating terminal information, upon receipt of the originating terminal information; and a non-transfer notification section that notifies a user of one's own terminal equipment of the effect that one's own terminal equipment does not receive the audio data, when the decision section decides that one's own terminal equipment is one concerned with the stop of transfer of the audio data.

16. A communication system according to claim 1, wherein the server equipment comprises:

a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, and wherein the terminal equipment comprises:

a confirmation section that confirms a stop of transfer of the audio data from the originating terminal equipment to a user of one's own terminal equipment in accordance with the non-transfer confirmation information upon receipt of the non-transfer confirmation information; and an alternative audio reproducing section that reproduces other voices prescribed instead of reproduction of voice by the audio reproduction section, when the confirmation section confirms a stop of transfer of the audio data.

17. A communication system according to claim 1, wherein at least one terminal equipment of said two or more terminal equipments constitutes another communication system including two or more terminal equipments wherein at least part of terminal equipment is different from said two or more terminal equipments, the another communication system being different from said communication system, wherein said at least one terminal equipment comprises a participation answer section that is asked right or wrong of participation in the communication system and answers, wherein each of said two or more terminal equipments comprises:

a transfer terminal input section that inputs the transfer terminal equipment through an input operation where one's own terminal equipment becomes the originating terminal equipment; and a transfer terminal notification section that notifies the server equipment of the transfer terminal equipment input by the transfer terminal input section, and wherein the server equipment comprises:

a participation propriety question section that receives from the terminal equipment notification of the transfer terminal equipment, and asks right or wrong of participation in the communication system to the transfer terminal equipment when the transfer terminal equipment constitutes said another communication system; and an answer setting section that obtains answer to question by the participation propriety question section and sets a terminal equipment that has returned the answer to the transfer destination setting section as the transfer terminal equipment associated with the terminal equipment that has notified the transfer terminal equipment when the answer indicates acceptable participation.

18. A server equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment; and a transfer restriction section that restrictively transfers the audio data to the transfer terminal equipment when the audio data transfer section transfers the audio data.

19. A terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments, the server equipment comprising:

an audio data receiving section that receives the audio data transmitted from the terminal equipment;

an audio data transfer section that transfers the audio data received by the audio data receiving section to each of the other terminal equipments excepting an originating terminal equipment that originates the audio data;

a transfer destination setting section that associates a transfer terminal equipment, to which the audio data is to be transferred by the audio data transfer section, with the terminal equipment that becomes the originating terminal equipment, when the terminal equipment becomes the originating terminal equipment;

a transfer restriction section that restrictively transfers the audio data to the transfer terminal equipment when the audio data transfer section transfers the audio data; and an association data receiving section that receives association data representative of an association between the transfer terminal equipment and each of said two or more terminal equipments and sets the transfer terminal equipment to the transfer destination setting section in accordance with the association represented by the association data, the terminal equipment comprising:
an association data creating section that creates association data representative of the association in accordance with an operation;
an association data transmitting section that transmits the association data created by the association data creating section;
an audio data transmitting section that transmits the audio data;
a transferred audio data receiving section that receives the audio data transferred from the server equipment; and
an audio reproducing section that reproduces in real-time the voice represented by the audio data received by the transferred audio data receiving section.

20. A terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments,
the server equipment comprising:
an audio data receiving section that receives the audio data transmitted from the terminal equipment;
an audio data transfer section that transfers the audio data received by the audio data receiving section to each of the other terminal equipments excepting an originating terminal equipment that originates the audio data;
a transfer destination setting section that associates a transfer terminal equipment, to which the audio data is to be transferred by the audio data transfer section, with the terminal equipment that becomes the originating terminal equipment, when the terminal equipment becomes the originating terminal equipment;
a transfer restriction section that restrictively transfers the audio data to the transfer terminal equipment when the audio data transfer section transfers the audio data; and
a notification setting section that sets the transfer terminal equipment to the transfer destination setting section associating with the terminal equipment that notifies of the transfer terminal equipment upon receipt of notification of the transfer terminal equipment from the terminal equipment,
the terminal equipment comprising:
a transfer terminal input section that inputs the transfer terminal equipment through an input operation where one's own terminal equipment becomes the originating terminal equipment;
a transfer terminal notification section that notifies the server equipment of the transfer terminal equipment that is input by the transfer terminal input section;
an audio data transmitting section that transmits the audio data;
a transferred audio data receiving section that receives the audio data transferred from the server equipment; and
an audio reproducing section that reproduces in real-time the voice represented by the audio data received by the transferred audio data receiving section.

21. A terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments,
the server equipment comprising:
an audio data receiving section that receives the audio data transmitted from the terminal equipment;
an audio data transfer section that transfers the audio data received by the audio data receiving section to each of the other terminal equipments excepting an originating terminal equipment that originates the audio data;
a transfer destination setting section that associates a transfer terminal equipment, to which the audio data is to be transferred by the audio data transfer section, with the terminal equipment that becomes the originating terminal equipment, when the terminal equipment becomes the originating terminal equipment;
a transfer restriction section that restrictively transfers the audio data to the transfer terminal equipment when the audio data transfer section transfers the audio data; and
a busy information transmitting section that transmits busy information indicative of the effect that other terminal equipment is the originating terminal equipment on a basis that what terminal equipment is the originating terminal equipment, to other terminal equipments excepting the originating terminal equipment, of two or more terminal equipments,
the terminal equipment comprising:
a busy notification section that notifies with an image unable to specify the originating terminal equipment a user of one's own terminal equipment of the effect that other terminal equipment is the originating terminal equipment upon receipt of the busy information;
an audio data transmitting section that transmits the audio data;
a transferred audio data receiving section that receives the audio data transferred from the server equipment; and
an audio reproducing section that reproduces in real-time the voice represented by the audio data received by the transferred audio data receiving section.

22. A terminal equipment used in a communication system that includes one or more terminal equipments and a server equipment, transmits audio data representing voice from one of the terminal equipments, transfers the audio data to other terminal equipments at the server equipment and reproduces the voice in real-time at the other terminal equipments,
the server equipment comprising:
an audio data receiving section that receives the audio data transmitted from the terminal equipment;
an audio data transfer section that transfers the audio data received by the audio data receiving section to each of the other terminal equipments excepting an originating terminal equipment that originates the audio data;
a transfer destination setting section that associates a transfer terminal equipment, to which the audio data is to be transferred by the audio data transfer section, with the terminal equipment that becomes the originating terminal equipment, when the terminal equipment becomes the originating terminal equipment;
a transfer restriction section that restrictively transfers the audio data to the transfer terminal equipment when the audio data transfer section transfers the audio data; and
a confirmation information transmitting section that transmits non-transfer confirmation information indicative of the effect that it is possible to confirm in at least a terminal equipment side that the audio data is not transferred, to other terminal equipments excepting both the originating terminal equipment and the transfer terminal equipment, of two or more terminal equipments, the terminal equipment comprising:

a confirmation section that confirms a stop of transfer of the audio data from the originating terminal equipment to a user of one's own terminal equipment in accordance with the non-transfer confirmation information upon receipt of the non-transfer confirmation information;

a non-transfer notification section that notifies a user of one's own terminal equipment of the effect that one's own terminal equipment does not receive the audio data, when the confirmation section confirms a stop of transfer of the audio data;

an audio data transmitting section that transmits the audio data;

a transferred audio data receiving section that receives the audio data transferred from the server; and an audio reproducing section that reproduces in real-time the voice represented by the audio data received by the transferred audio data receiving section.

* * * * *